US011150605B1

(12) United States Patent
Xiao et al.

(10) Patent No.: US 11,150,605 B1
(45) Date of Patent: Oct. 19, 2021

(54) SYSTEMS AND METHODS FOR GENERATING HOLOGRAMS USING DEEP LEARNING

(71) Applicant: Facebook Technologies, LLC, Menlo Park, CA (US)

(72) Inventors: Lei Xiao, Redmond, WA (US); Andrew Maimone, Duvall, WA (US); Robin Joseph Swanson, Redmond, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/517,850

(22) Filed: Jul. 22, 2019

(51) Int. Cl.
*G03H 1/08* (2006.01)
*G06N 3/08* (2006.01)
*G06N 3/04* (2006.01)

(52) U.S. Cl.
CPC ............ *G03H 1/0866* (2013.01); *G06N 3/04* (2013.01); *G06N 3/08* (2013.01); *G03H 2240/11* (2013.01)

(58) Field of Classification Search
CPC ............... G03H 1/0866; G03H 1/0891; G03H 2240/11; G03H 2001/0088; G03H 2227/02; G06N 3/04; G06N 3/08
See application file for complete search history.

(56) References Cited

U.S. PATENT DOCUMENTS

| | | | |
|---|---|---|---|
| 2011/0216160 A1* | 9/2011 | Martin | H04N 5/89 348/40 |
| 2013/0222873 A1* | 8/2013 | Kwon | G02B 5/1876 359/9 |
| 2015/0253730 A1* | 9/2015 | Cho | G03H 1/0808 359/9 |
| 2017/0322679 A1* | 11/2017 | Gordon | G06N 20/00 |
| 2018/0089505 A1* | 3/2018 | El-Khamy | G06T 7/73 |
| 2019/0155033 A1* | 5/2019 | Gelman | G02B 27/0172 |
| 2019/0294108 A1* | 9/2019 | Ozcan | G03H 1/2202 |
| 2019/0317451 A1* | 10/2019 | Supikov | G06K 9/4661 |
| 2020/0265294 A1* | 8/2020 | Kim | G06N 3/0454 |

OTHER PUBLICATIONS

Agustsson, et al., Ntire 2017 Challenge on Single Image Super Resolution: Dataset and Study, in the IEEE Conference on Computer Vision and Pattern Recognition (CVPR) Workshops, Jul. 2017.

(Continued)

*Primary Examiner* — Alexander Gee
(74) *Attorney, Agent, or Firm* — Baker Botts L.L.P.

(57) ABSTRACT

In one embodiment, a system may generate a hologram by processing a first image using a machine-learning model. The system may generate a second image based on at least a portion of the hologram using a processing model that is configured to simulate interactions between a light source and the hologram. The system may compare the second image to the first image to calculate a loss based on a loss function. The system may update the machine-learning model based on the loss between the first image and the second image. The updated machine-learning model is configured to process one or more input images to generate one or more corresponding holograms.

20 Claims, 21 Drawing Sheets

(56) References Cited

OTHER PUBLICATIONS

Burckhardt, et al., A Simplification of lee's Method of Generating Holograms by Computer, Applied Optics, vol. 9, No. 8, pp. 1949-1949, 1970.

Fienup, et al., Reconstruction of an Object from the Modulus of Its Fourier Transform, Optics Letters, vol. 3, No. 1, pp. 27-29, 1978.

Georgiou, et al., Aspects of Hologram Calculation for Video Frames, Journal of Optics A: Pure and Applied Optics, vol. 10, No. 3, p. 035302, 2008.

Gerchberg, et al., A practical algorithm for the determination of phase from image and Diffraction Plane Pictures, Optik, vol. 35, pp. 237-246, 1972.

Glorot, et al., Understanding the Difficulty of Training Deep Feedforward Neural Networks, in Proceedings of the Thirteenth International Conference on Artificial Intelligence and Statistics, pp. 249-256, 2010.

Haussler, et al., Large real-time Holographic 3d Displays: Enabling Components and Results, Applied Optics, vol. 56, No. 13, pp. F45-F52, 2017.

He, et al., Deep Residual Learning for Image Recognition, in Proceedings of the IEEE Conference on Computer Vision and Pattern Recognition, 770-778, 2016.

Horisaki, et al., Deep-learning-generated holography, Applied Optics, vol. 57, No. 14, pp. 3859-3863, 2018.

Hsueh, et al., Computer-generated double-phase holograms, Applied Optics, vol. 17, No. 24, pp. 3874-3883, 1978.

Lecun, et al., Gradient-Based Learning Applied to Document Recognition, Proceedings of the IEEE, vol. 86, No. 11, pp. 2278-2324, 1998.

Lin, et al., Microsoft Coco: Common Objects in Context, in European Conference on Computer Vision, Springer, pp. 740-755, 2014.

Maimone, et al., Holographic near-eye displays for virtual and augmented reality, ACM Transactions on Graphics (TOG), vol. 36, No. 4, p. 85, 2017.

Ronneberger, et al., U-NET: Convolutional Networks for Biomedical Image Segmentation, in International Conference on Medical Image Computing and Computer-Assisted Intervention, Springer, pp. 234-241, 2015.

Wang, et al., Eholonet: A Learning-Based End-To-End Approach for In-Line Digital Holographic Reconstruction, Optics Express, vol. 26, No. 18, pp. 22603-22614, 2018.

Wang, et al., Non-Local Neural Networks, in the IEEE Conference on Computer Vision and Pattern Recognition (CVPR), vol. 1, No. 3, p. 4, 2018.

Yu, et al., Dilated Residual Networks, in Computer Vision and Pattern Recognition (CVPR), 2017.

\* cited by examiner

600

SYSTEMS AND METHODS FOR GENERATING HOLOGRAMS USING DEEP LEARNING

TECHNICAL FIELD

This disclosure generally relates to deep-learning and computer graphics.

BACKGROUND

Generating high quality and full-resolution phase-only holograms is one of the purposes that today's holographic displays attempt to achieve. However, generating said holograms is using a computationally expensive, time-consuming, iterative algorithm to accomplish a required optimization. The traditional iterative methods are usually applied to optical systems where each point in an input is affected by each point of the hologram, and therefore are not applicable to all holographic displays, such as wide-field-of-view holographic displays. Other existing methods using machine-learning (ML) to generate said holograms also have a limited receptive field which restricts the type and quality of the output when applying to said optical systems.

Furthermore, there are some other challenges to the current iterative methods and the ML methods. The ML methods to generate said holograms are specific to sparse, binary images and therefore fail to generate high quality, phase-only holograms based on high resolution natural images. Therefore, there is a need to solve the aforementioned problems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SUMMARY OF PARTICULAR EMBODIMENTS

Figure 1A:
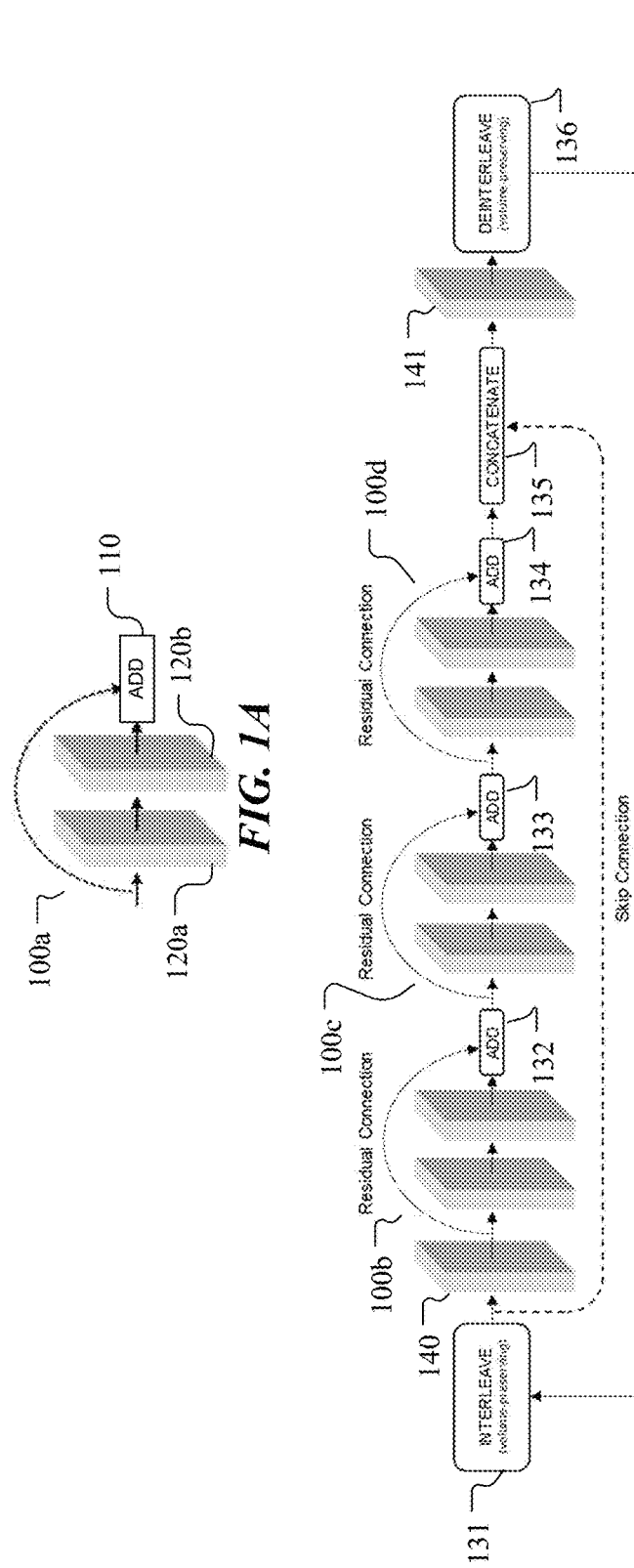
FIGS. 1A-1B illustrate embodiments of a deep-learning network architecture.

The present disclosure focuses on addressing expensive, time-consuming methods to generate high quality and full-resolution phase-only holograms. First, particular embodiments of the present disclosure train a machine-learning model on natural photographs rather than binary images, thereby allowing the machine-learning model to learn to generate holograms for more complex natural images. Second, particular embodiments of the present disclosure utilize a processing model using a propagation kernel when training the machine-learning model, so that training the machine-learning model does not require ground-truth holograms that are generated using traditional methods, which are computationally expensive and may not be the optimum solution. Third, particular embodiments of the present disclosure do not rely on ground-truth holograms for training which gives the machine-learning model the freedom to generate any optimal hologram with respect to the chosen image quality loss functions.

To further improve quality, particular embodiments are designed to take advantage of characteristics of holograms designed for wide-field-of-view displays. Particular embodiments compute a hologram that only a local region (or sub-hologram) of the hologram affects each point in the output image. Therefore, particular embodiments are not limited in the spatial size over which they can reason. In particular, the machine-learning architecture described in the present disclosure has the ability to vary the size of its receptive field without changing its overall design or number of parameters. The size of the receptive fields may be adjusted using dilated convolution blocks (e.g., a 3×3 filter may sample sparse, non-adjacent pixels) that are sized depending on the sub-hologram's spatial dimensions. Since the level of dilation does not need to extend to the entire hologram, the amount of undesirable artifacts may also be minimized.

Several embodiments are elaborated in this disclosure. According to one embodiment of a method for generating holograms, the method comprises, by a computing system, generating a hologram by processing a first image using a machine-learning model. The method further comprises generating a second image based on at least a portion of the hologram using a processing model that is configured to simulate interactions between a light source and the hologram. The method additionally comprises comparing the second image to the first image to calculate a loss based on a loss function. The method further comprises updating the machine-learning model based on the loss between the first image and the second image. The updated machine-learning model is configured to process one or more input images to generate one or more corresponding holograms.

In one embodiment, the machine-learning model comprises one or more dilated convolutional blocks. The one or more dilated convolutional blocks are configured to utilize a propagation kernel to generate the one or more corresponding holograms.

In one embodiment, the machine-learning model comprises at least one residual block that comprises sequentially connected layers. The sequentially connected layers comprise a first layer and a last layer. The residual block is configured to add an input of the first layer to an output of the last layer.

In one embodiment, the machine-learning model comprises a plurality of layers that includes a last layer and a next-to-last layer. The machine-learning model is configured to generate a concatenated result by concatenating an input of the machine-learning model with an output of the next-to-last layer. The last layer is configured to use the concatenated result as input.

In one embodiment, the hologram is a sub-hologram of a larger hologram, and the first image is a portion of a larger image.

In one embodiment, the processing model is configured to perform convolution of a phase definition on the hologram. In one embodiment, the convolution performed by the processing model is based on a propagation kernel.

In one embodiment, the propagation kernel is defined based on an optical system designed for viewing the holograms generated by the machine-learning model.

In one embodiment, the sub-hologram has a size less than 50% of a resolution of the first image. In one embodiment, a resolution of the first image is at least 720p.

In one embodiment, the updated machine-learning model is configured to generate images for wide-field-of-view (FOV) displays. In one embodiment, the wide-field-of-view display comprises a FOV larger than 40 degrees. In one embodiment, the updated machine-learning model is configured to generate images for near-eye displays, television monitors, cinema screens, computer monitors, mobile phones, or tablets.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Generating high quality and full resolution phase-only holograms is a computationally expensive problem that is currently solved with iterative optimization. Most algorithms target a classical holographic display architecture where each point in the hologram affects each point in a far field image. However, recent developments in wide field of view holographic displays present architectures in which only a local region affects each point in the image. Embodiments described herein provides a system including a machine-learning model for generating full-resolution holograms for wide field of view (FOV) holographic displays. In particular embodiments, the machine-learning model is a deep-learning model. Embodiments described herein provides a processing model to train the machine-learning model by applying a propagation kernel to confine a size of the sub-hologram and expand the receptive field. In particular embodiments, the processing model is a forward model to further process a generated hologram. Therefore, embodiments described herein offer a machine-learning model which is trained to generate high-resolution holograms for a limited spatial support of modern holographic displays.

Furthermore, particular embodiments of the present disclosure provide a deep-learning architecture without changing its overall design or parameters which are defined by the characteristics of network and display. Particular embodiments of the present disclosure train the deep-learning model by incorporating a physical image formation model into the loss function.

As discussed above, particular embodiments may use machine learning to generate the desired outputs. Provided below is an overview of particular embodiments of a machine-learning architecture and its inputs and training procedures to support rendering for wide field-of-view (FOV) holographic displays. The framework provides a unified design to efficiently solve these problems with high quality performance and limitations to optical systems.

Particular embodiments of the machine-learning architecture may be based on a fully convolutional network (FCN). The FCN may have convolutions at every layer of the network, omitting the final fully-connected layer that some networks use for classification. FCNs are purely feed-forward networks, so evaluation can be highly efficient, although this depends on the number of layers and the size of convolution kernels. Various variants of the FCN may be used for image synthesis. For example, particular embodiments may use encoder-decoder networks having a "U-Net" shape, with successive down-sampling followed by up-sampling to produce the final image. The encoder-decoder architecture gives the output neurons a large receptive field, although to preserve detail in the final output, skip connections from the encoder layers to corresponding decoder layers may be used. Alternatively, the network can maintain full resolution at all layers, without any pooling.

Figure 1B:
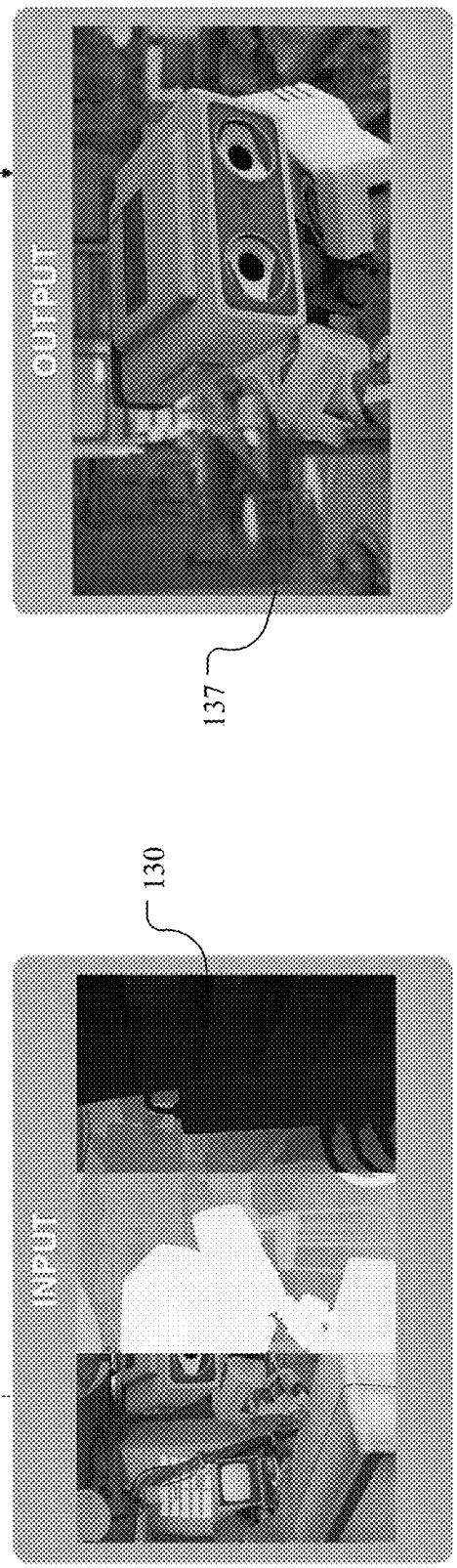

FIGS. 1A-1B illustrate embodiments of a deep-learning network architecture. At a high level, the network may be a fully convolutional network (FCN) with residual net blocks at each layer. In particular embodiments, the network may have full resolution at each layer, without pooling, with an added long-distance skip connection from the input to the final layer. In general, FIG. 1A shows an embodiment of a residual block, which is used as the basic building block of the network; and FIG. 1B shows a fast network embodiment that has 8 layers and a varying number of filters (e.g. 128, 64, and 32) at each layer. While a particular number of filters are depicted, the current disclosure contemplates other filter combinations as well. For example, particular embodiments of the 8-layer network may have a constant number of filters (e.g. 64, 128, or 256, etc.).

More specifically, FIG. 1A depicts a single residual block 100a, the basic element of the network in particular embodiments. The residual block 100a shown has two layers, a first layer 120a and a second layer (or last layer) 120b. In other embodiments, the residual block 100a may have additional sequentially connected layers (e.g., instead of two layers as shown, it may have three, four, or any number of layers). Each residual block 100a may add 110 an input of its first layer 120a to the output of its last layer 120b through a "residual connection" before passing the added output to the next block (not shown in FIG. 1A). In particular embodiments, all weights may be set to zero, thus making the residual block 100a an identity function—small variations near zero allow the residual block 100a to learn to refine its input. This is particularly relevant for input processing tasks, where the desired output is close to the original input but with added blur or slightly shifted viewpoint. The number of residual blocks and the number of filters in each layer are selected to balance the quality and the inference time for the applications. For example, FIG. 1B shows an eight-layered network with three residual blocks 100b-d that sacrifices some quality for inference speed. In particular embodiments, the eight-layer network shown in FIG. 1B, which is more tailored for speed, may take all channels as input and output color results in a single pass of network evaluation.

The network architecture shown in FIG. 1B includes eight layers with three residual blocks 100b-d. Specifically, FIG. 1B shows an input 130 being provided to a first layer 140 via an input layer 131 which functions as an interleave interface for an original input. The input 130 may have a variety of display issues, such as defocus blur application, hologram generation, and light field interpolation. The input layer 131 may preserve a size of the input 130 in an output utilizing zero-padding. The output of the first layer 140 is passed to a first residual block 100b (with two layers), which is configured to add 132 the input of the block 100b to the output of the last layer in the block 100b. The result is then passed to a second residual block 100c, where a similar operation is performed. In particular embodiments, the second residual block 100c may be configured to reduce the size of the feature maps to further speed up operations (e.g., the first residual block 100b operates on 128 feature maps, whereas the second residual block 100c operates on 64 feature maps). The output of the second residual block 100c (i.e., the output of the add operation 133) is then passed to a third residual block 100d, where a similar operation is performed. In particular embodiments, the third residual block 100d may be configured to keep the size of the feature maps (e.g. both of the second residual block 100c and the third residual block 100d operate on 64 feature maps). In particular embodiments, the third residual block 100d may be configured to further reduce the size of the feature maps to speed up operations (e.g., the second residual block 100c operates on 64 feature maps, whereas the third residual block 100d operates on 32 feature maps). The output of the third residual block 100d (i.e., the output of the add operation 134) is then passed to a last layer 141. The network may be configured to concatenate 135 its last layer 141 with the input layer 131 (or a transformation thereof in particular embodiments) through a "skip connection" immediately before the last layer 141. This long-distance skip connection allows preserving high-frequency details in the performance by letting the original input (e.g. the input 130) directly feed into a layer ready to generate an output (e.g. the last layer 141). The output of the last layer 141 may be then passed to an output layer 136 which functions as a deinterleave interface and preserves the volume of an output 137 as same as the volume of the input 130. The output layer 136 may then provide the output 137 to be displayed on the displays disclosed herein. The network may be more tailored for quality than speed, may process each color channel in a separate pass, therefore three channels of inputs are either processed sequentially or put together in a batch for network evaluation.

In particular embodiments, each layer of the network (e.g., the ones shown in FIG. 1B) may sequentially perform 2D convolutions with a propagated filter (e.g. a propagated filter size of 91×91, 121×121, or 177×177 pixels), do batch normalization, and then apply the exponential linear unit (ELU) activation function, with the exception of the last layer (e.g., 141). The last layer uses the hyperbolic tangent (Tan H) activation function scaled by $f(x)=(x+1)/2$ to bring the output (e.g., 137) within the range [0, 1]. Since the network is fully convolutional, it can be evaluated efficiently on GPU devices and scales to different input resolutions without retraining. Detailed embodiments of the propagated filter are described in further detail below.

In particular embodiments, the loss function for all applications includes a pixel-wise cost on peak signal-to-noise ratio (PSNR) of the result. Detailed embodiments of the loss function are described in further detail below.

Embodiments of the deep-learning model can be trained and applied to various input processing tasks for computational displays by changing the input and output of the network. In particular embodiments, the deep-learning model may be based on a convolutional neural network, such as the ones shown in FIGS. 1A-B. In other embodiments, the deep-learning model may be an autoencoder, a generative adversarial network, or any other suitable deep-learning architecture. Embodiments of the model may be configured to generate images for wide FOV displays, holographic displays, and light field displays, as described in further detail below.

Figure 2A:
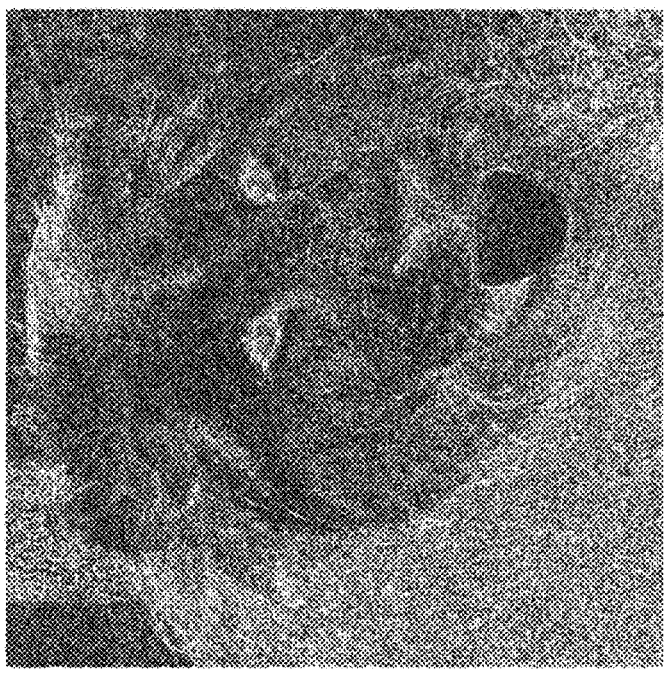
FIGS. 2A-2E illustrate an embodiment of an iterative algorithm for generating holograms.
Figure 2A:
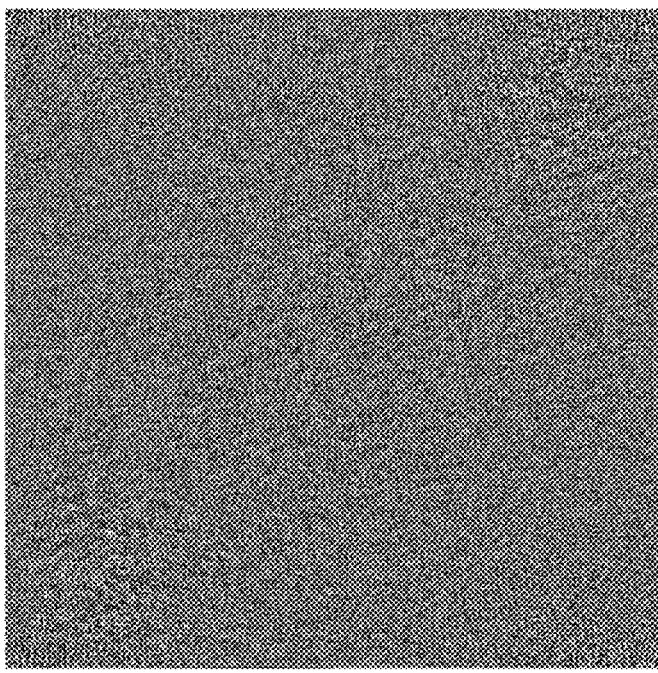
Figure 2A:
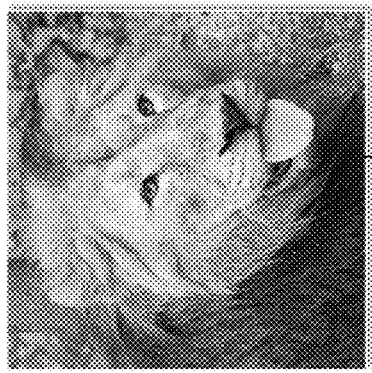
Figure 2B:
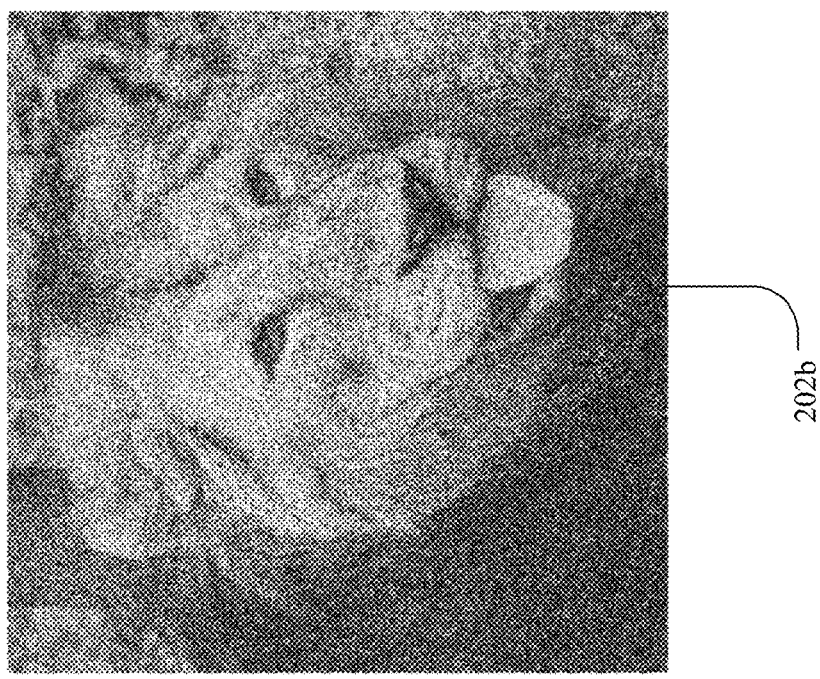
Figure 2B:
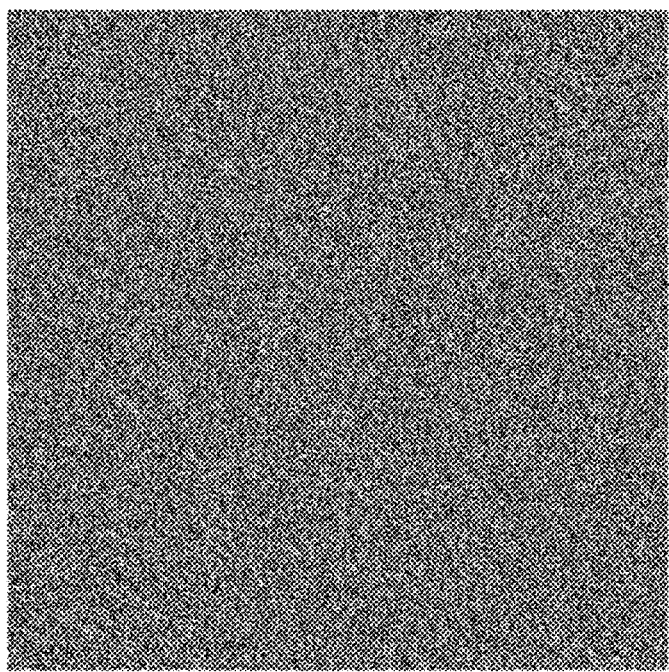
Figure 2B:
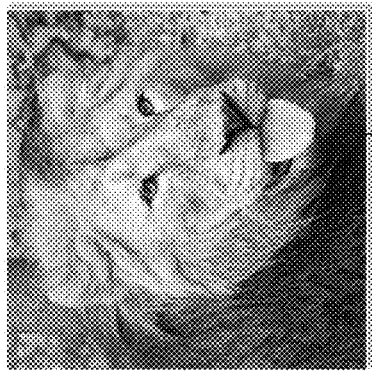
Figure 2C:
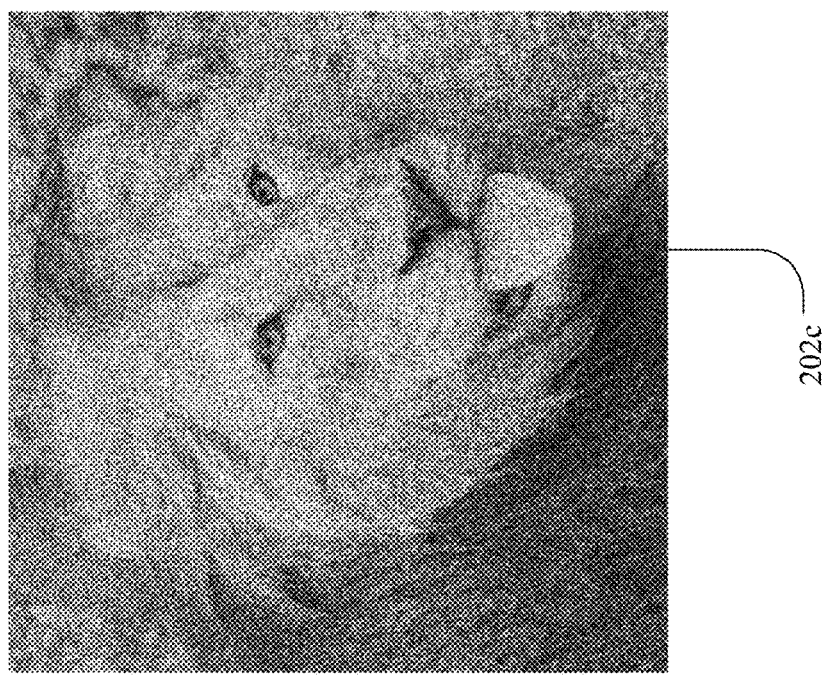
Figure 2C:
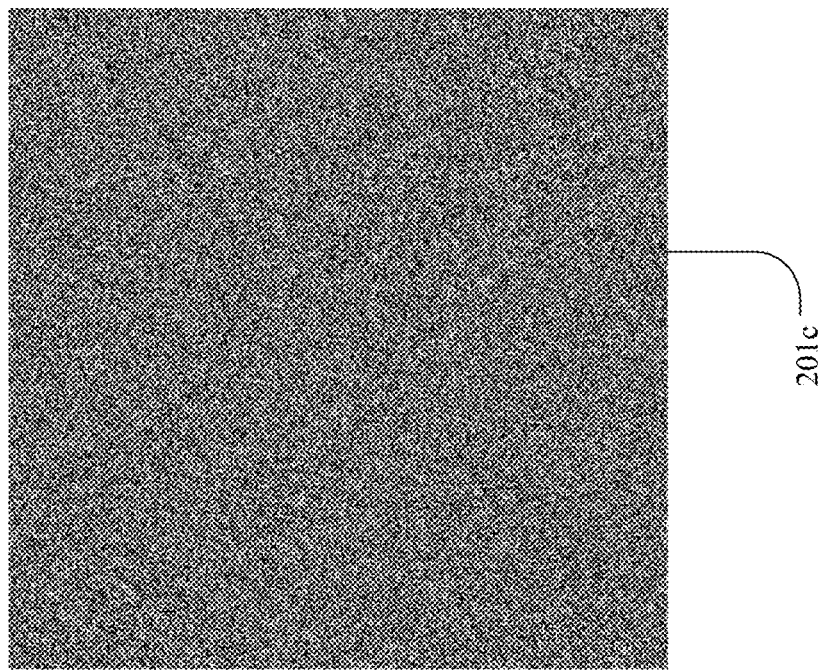
Figure 2C:
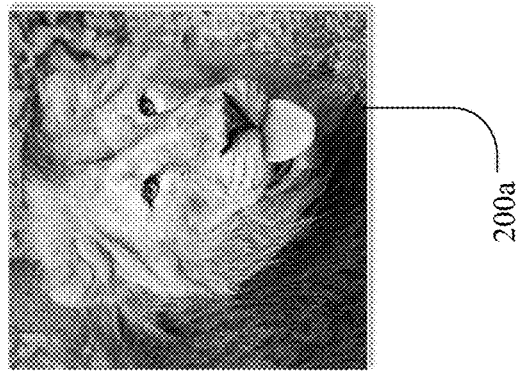
Figure 2D:
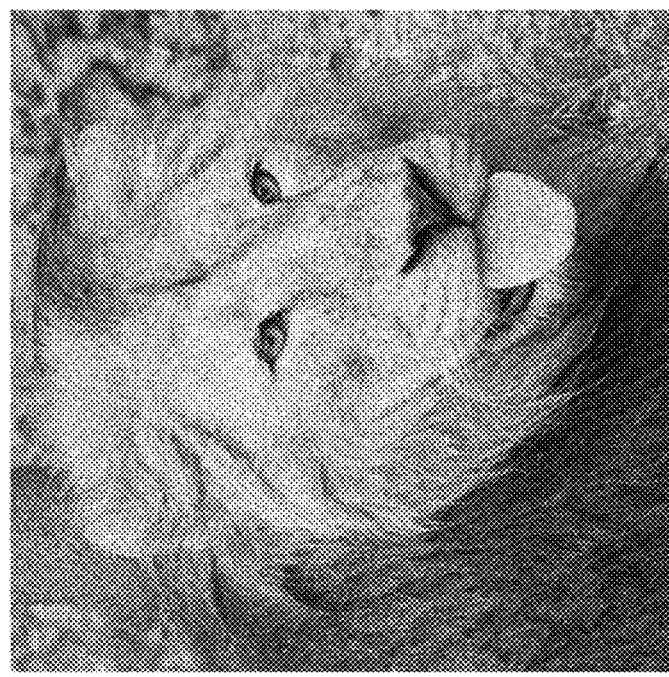
Figure 2D:
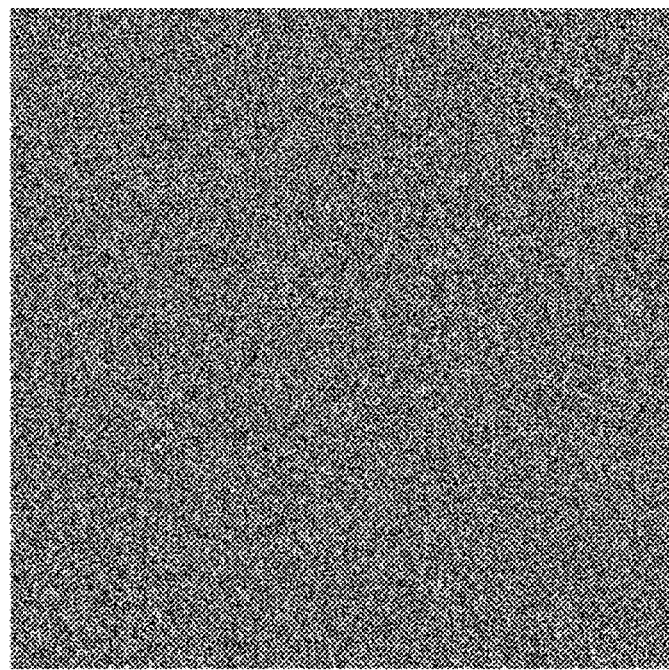
Figure 2D:
Figure 2E:
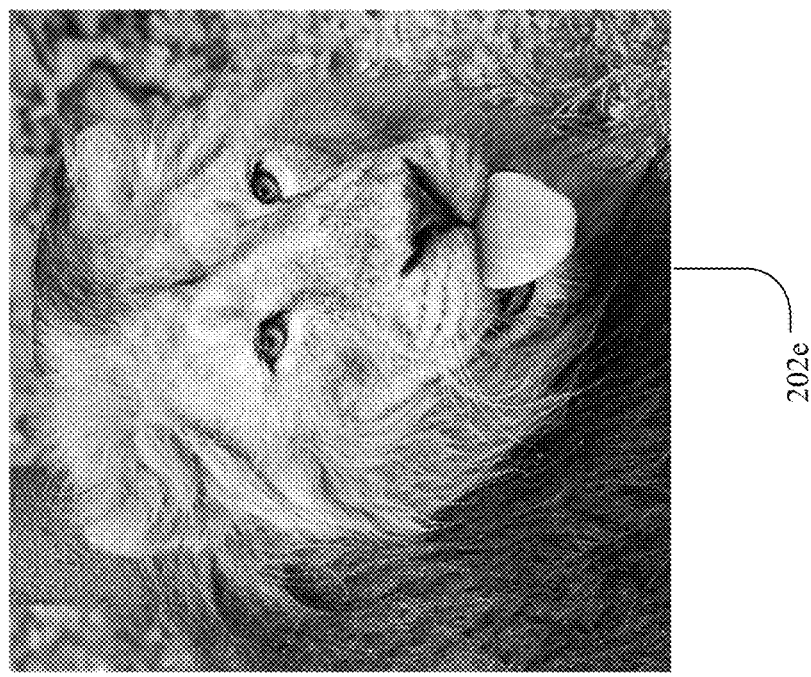
Figure 2E:
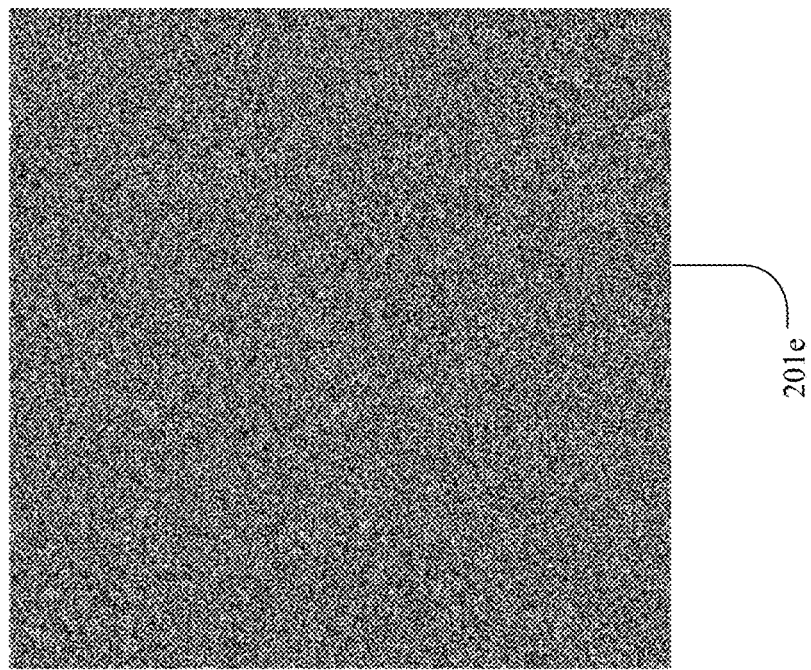
Figure 2E:
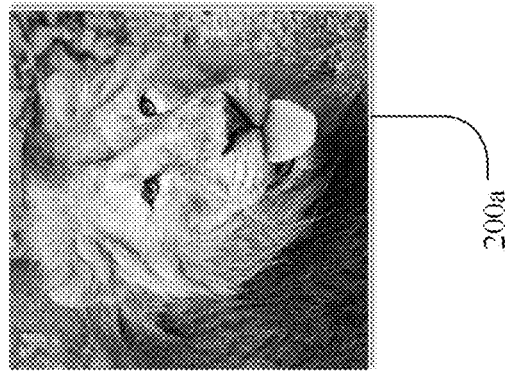

FIGS. 2A-2E illustrate an example of an iterative algorithm to generate phase-only holograms. In FIG. 2A, an iterative algorithm 200 accesses an input image 200a which may be a natural image, a photograph, or a binary image. The iterative algorithm 200 generates a hologram 201a based on the input image 200a. The iterative algorithm 200 then applies the hologram 201a to a spatial light modulator (SLM) to reconstruct an output image 202a. The output image 202a is a result of the first iteration performed by the iterative algorithm 200, and the iterative algorithm 200 compares the output image 202a with the input image 200a to determine the difference between these two images, so that the comparison may be applied to the next iteration to produce a better result. In FIG. 2B, based on the comparison performed in the first iteration, the iterative algorithm 200 generates a hologram 201b based on the input image 200a, and then applies the hologram 201b to the SLM to reconstruct an output image 202b. The output image 202b is a result from the second iteration performed by the iterative algorithm 200, and the iterative algorithm 200 compares the output image 202b with the input image 200a to determine the difference between these two images. Likewise, in FIG. 2C, an output image 202c is generated based on a hologram 201c computed based on previous comparisons. The output image 202c is a result of the fifth iteration. FIG. 2D illustrates an output image 202d which is a result of the tenth iteration, and FIG. 2E illustrates an output image 202e which is a result of the fiftieth iteration. In FIG. 2E, after fifty iterations, the output image 202e which is perceived by a user may be reconstructed based on a high-quality, phase-only hologram 201e.

In particular embodiments, when generating a hologram utilizing an iterative optimization, there is an opportunity to control the phase of the light at each point in the image. As image phase values are varied, the required amplitude values in the hologram would vary as well. Since the user's eyes are not sensitive to the image phase, the image phase values may be used as a variable in the iterative optimization. Therefore, particular embodiments aim to select a precise set of the image phase values, so that the required amplitude is uniform over the hologram which may thus be displayed on a phase-only modulator.

Other methods for computing a hologram in the far-field are the Gerchberg-Saxton (GS) algorithm and Fienup algorithm. Given enough time, both GS algorithm and Fienup algorithm may generate high quality holograms. However, these algorithms are typically not considered to run in real-time at high resolutions. An alternative method to iterative optimization is to modulate two or three amplitude or phase pixels together to directly encode a single complex (amplitude and phase) value in the hologram. The advantage of these methods is that they are very computationally efficient and tend to produce high quality results in practice. However, the disadvantage is that multiple modulator pixels are required to encode each pixel in the image, so that full resolution holograms are not possible but rather resolution is degraded by a factor of 2× to 3×. An additional hardware is also required to combine the phase or amplitude values optically.

Figure 3A:
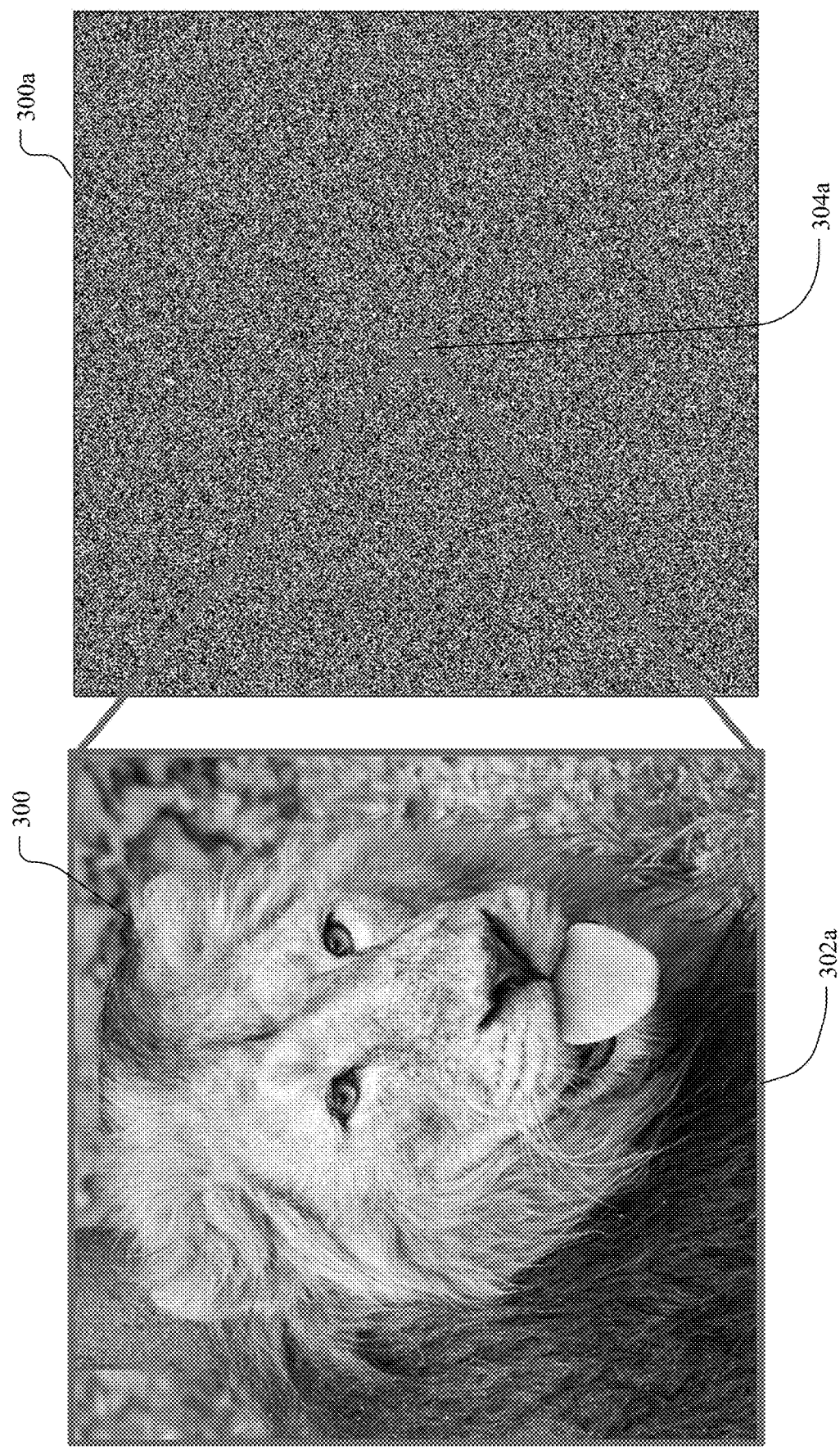
FIGS. 3A-3B illustrate embodiments of generating a far-field hologram
Figure 3B:
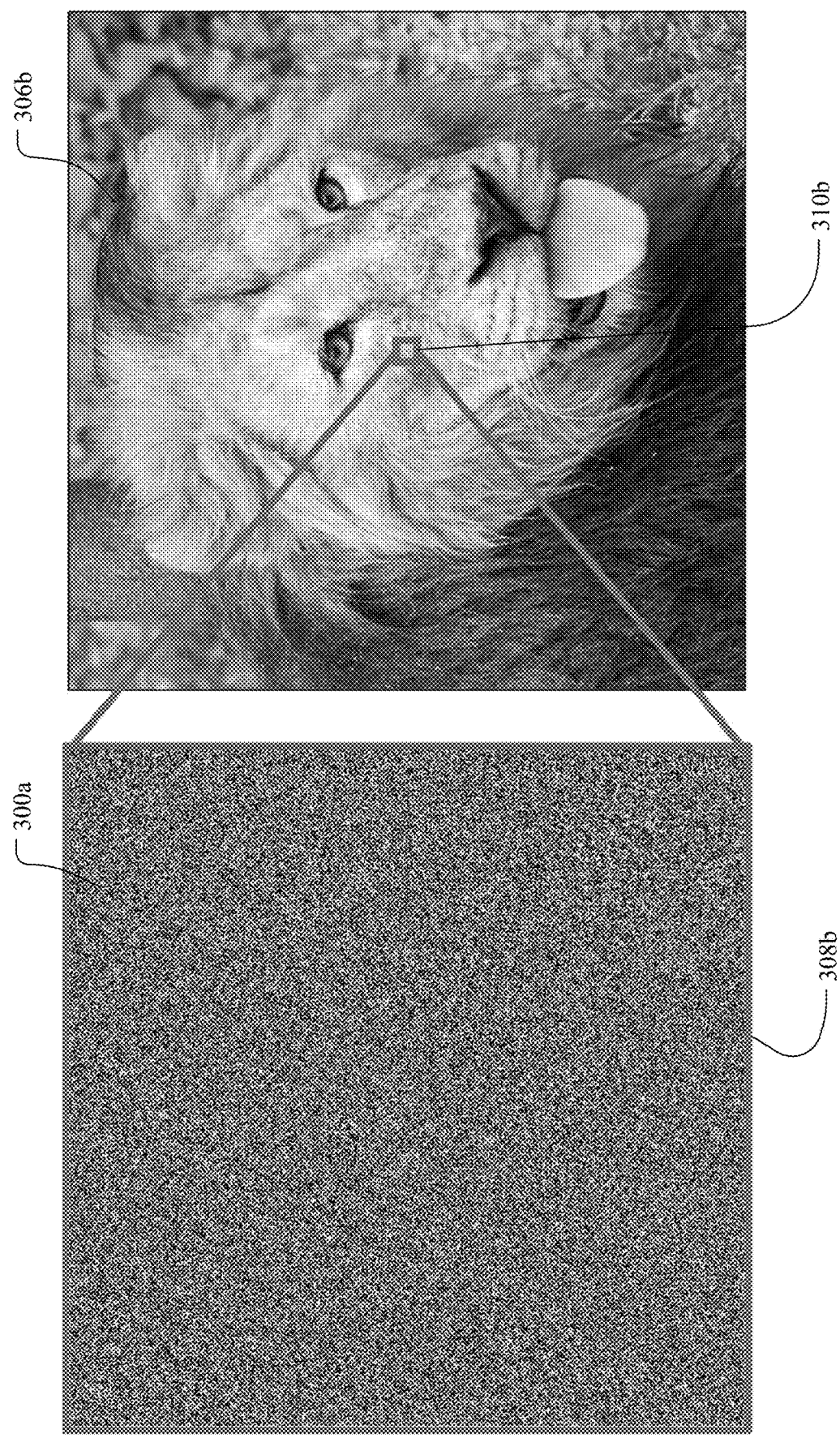

FIGS. 3A-3B illustrate an embodiment of generating a far-field hologram. In FIG. 3A, all pixels of the input image 300 are utilized to generate a far-field hologram 300a which is to be applied to a spatial light modulator (SLM) to resemble a target image. That is, a hidden neuron 304a used in the far-field holography may read an entire portion 302a of the input image 300 to compute the hologram 300a. In other words, every pixel in the input image 300 may affect the hologram 300a. In FIG. 3B, the hologram 300a reconstructs an output image 306b. Each portion 310b of the output image 306b are affected by an entire portion 308b of the hologram 300a. That is, the entire portion 308b of the larger hologram 300a are used to compute the output image 306b.

Figure 4A:
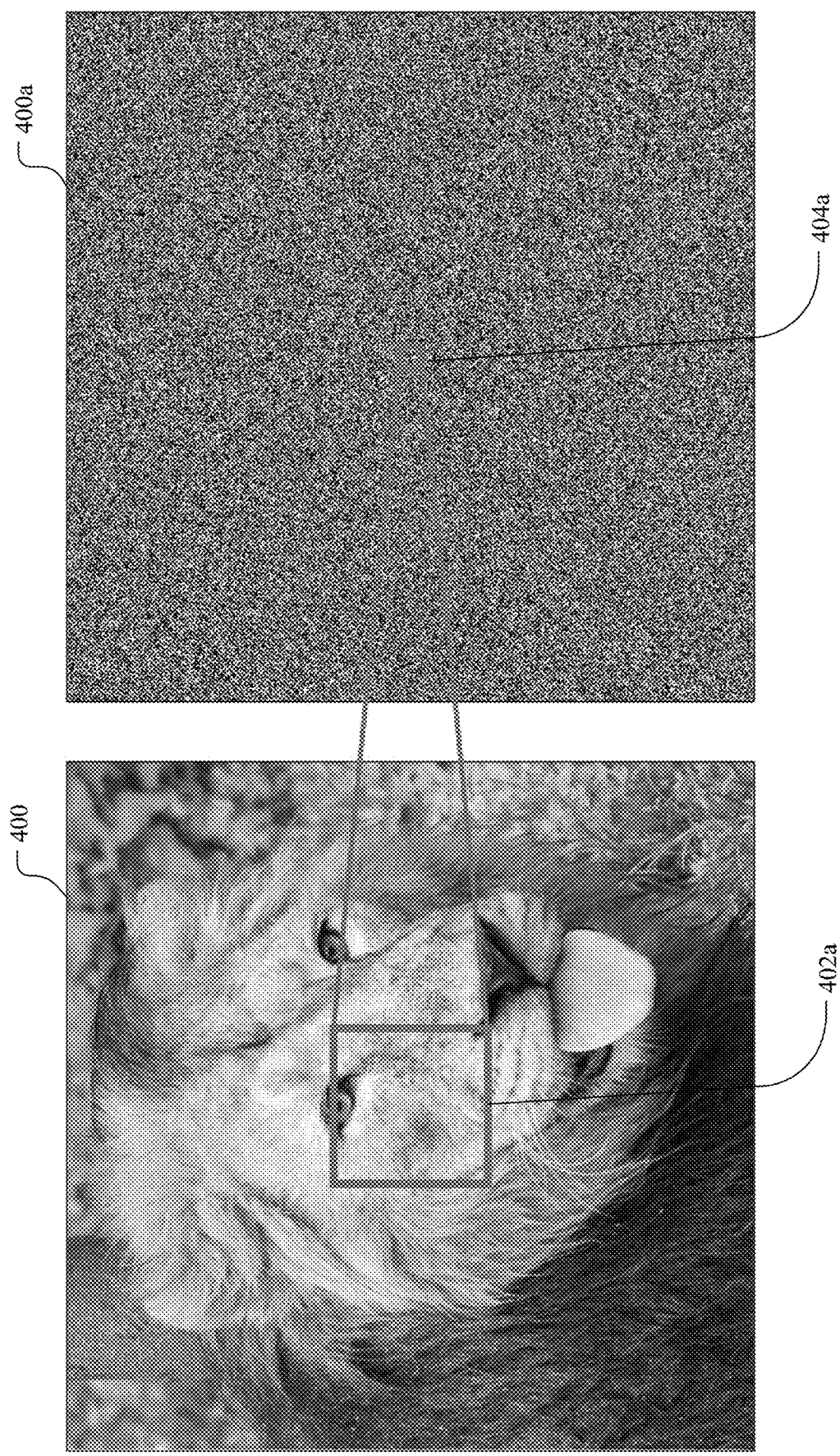
FIGS. 4A-4C illustrate embodiments of generating a receptive field hologram.
Figure 4B:
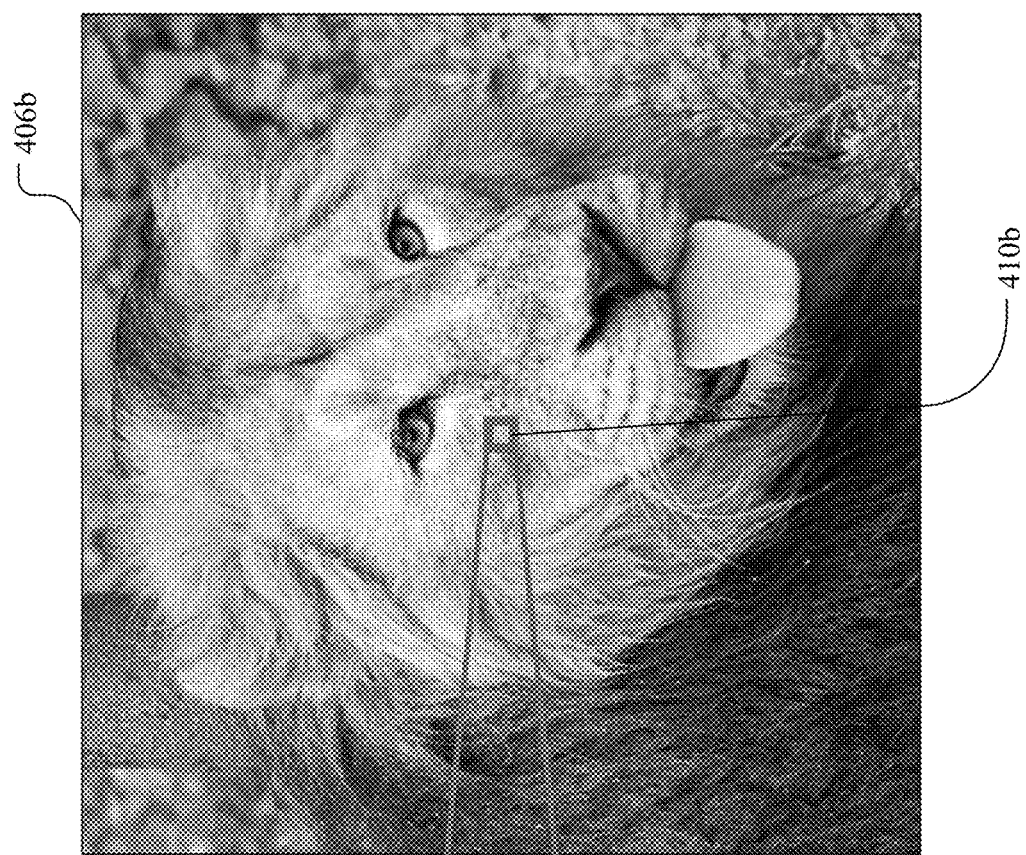
Figure 4B:
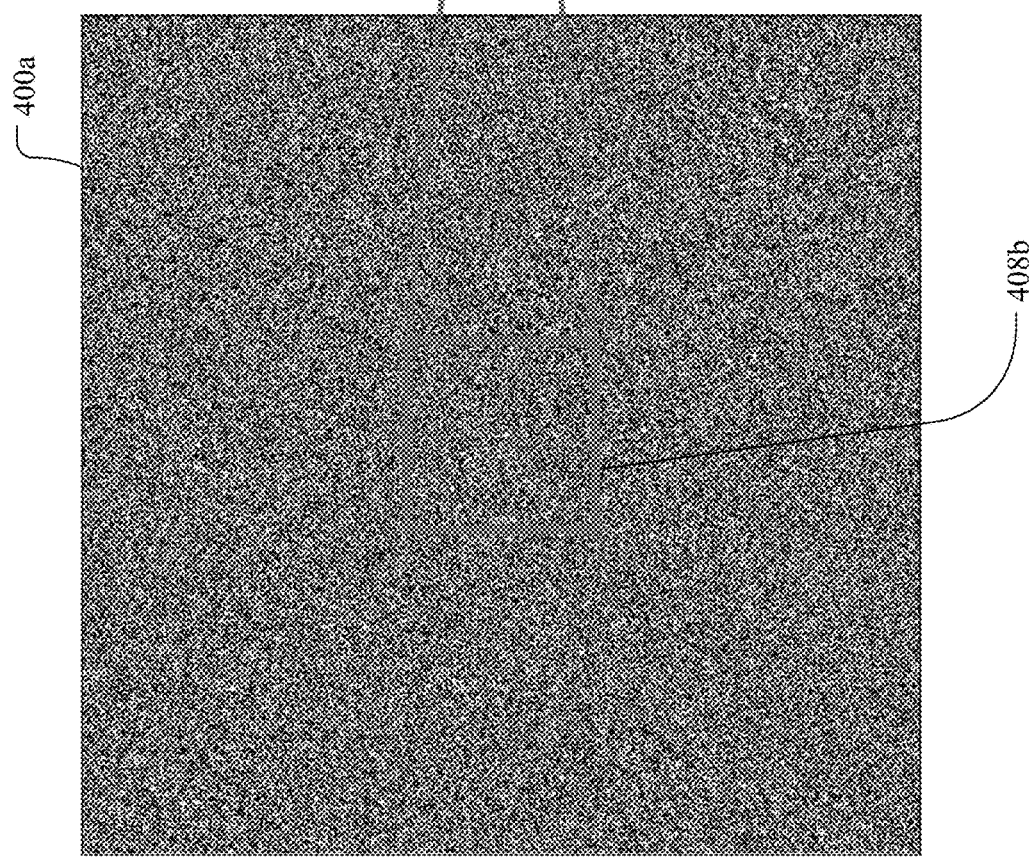
Figure 4C:
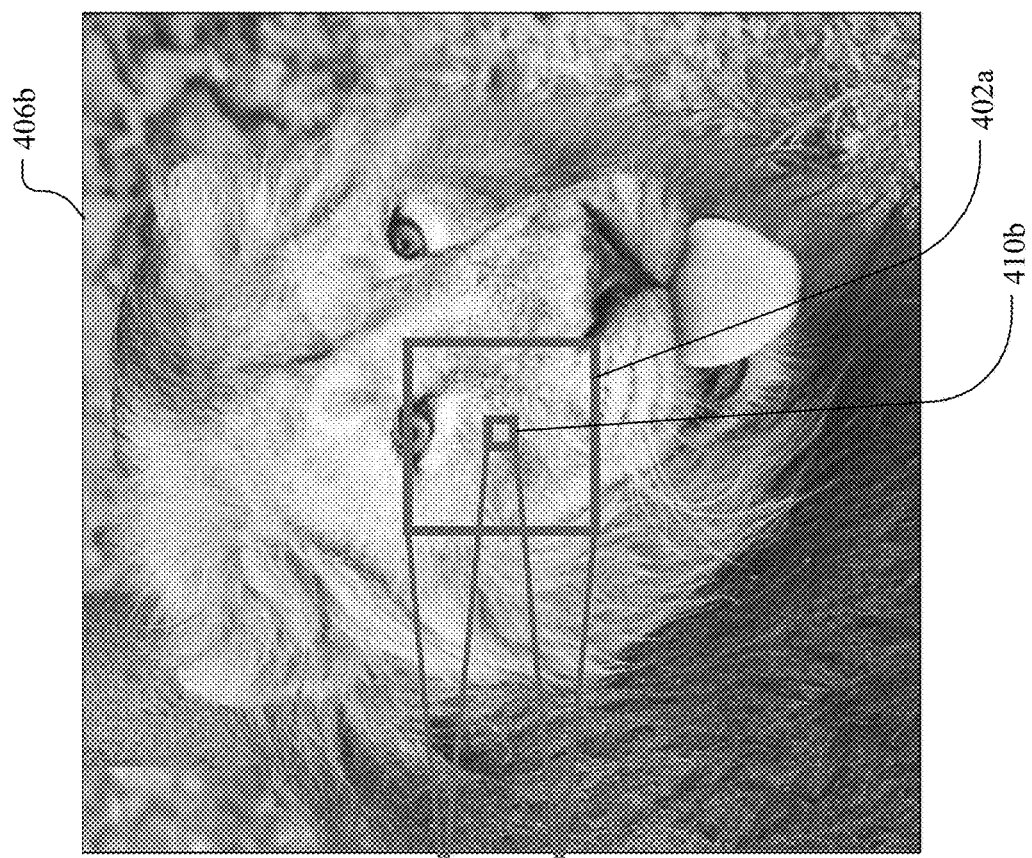

FIGS. 4A-4C illustrate an embodiment of generating a receptive-field hologram. In FIG. 4A, a portion 402a of the input image 400 is utilized to generate a hologram 404a which is to be applied to a SLM to resemble a target image. In particular embodiments, the hologram 404a may be a sub-hologram of a hologram 400a. In other words, a filter used in the limited receptive-field holography may only read the portion 402a of the input image 400 to compute the hologram 404a. That is, a receptive field of the hologram 404a is the portion 402a. In FIG. 4B, the hologram 408b reconstructs an output image 410b. In particular embodiments, the hologram 408b may be a sub-hologram of a hologram 400a. In particular embodiments, the output image 410b may be a portion of a larger output image 406b. Furthermore, FIG. 4C illustrates a range of the portion 402a in the larger output image 406b to demonstrate a comparison between the output image 410b and the portion 402a of the input image 400.

Figure 5:
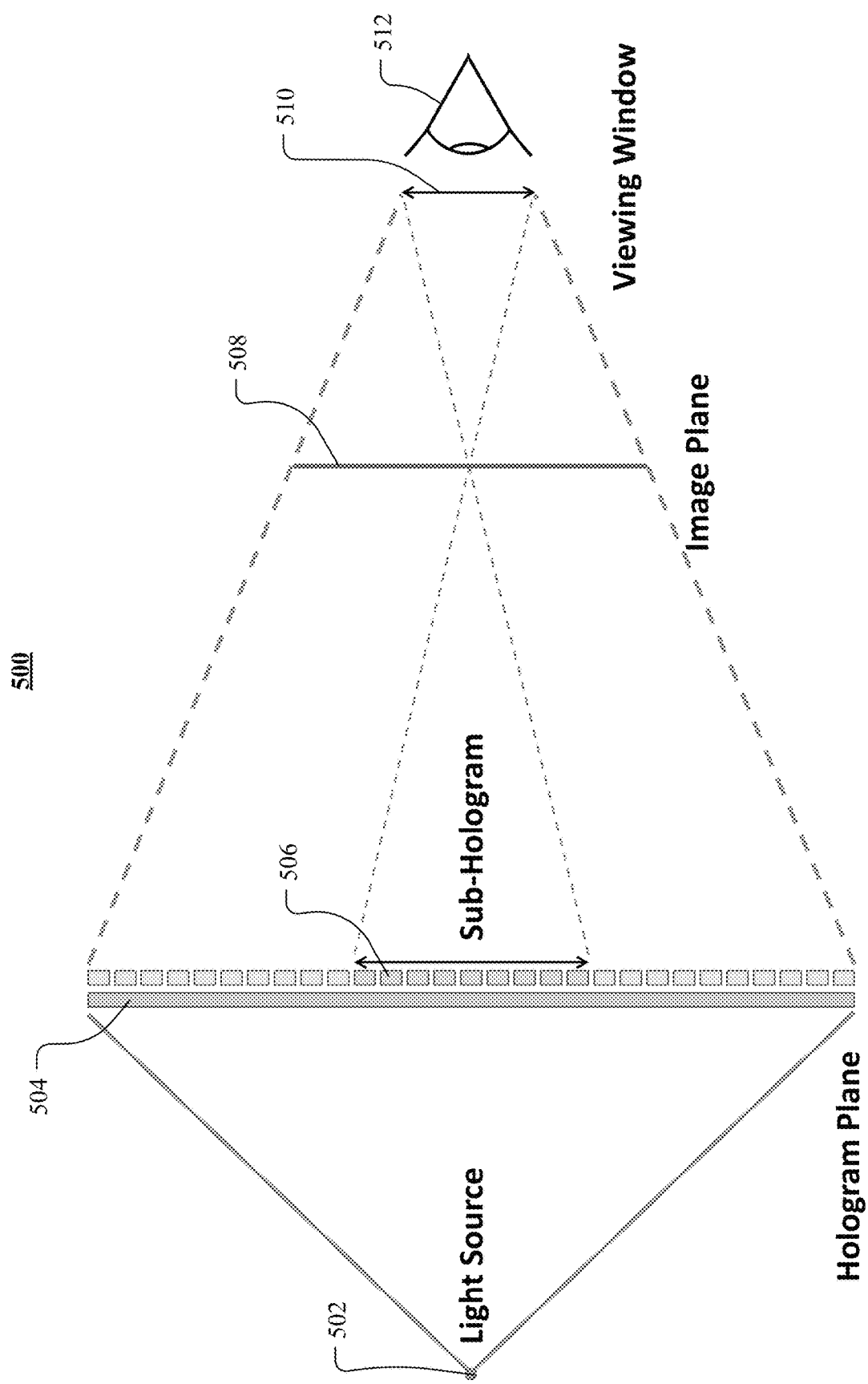
FIG. 5 illustrates an embodiment of a wide field-of-view holographic display.

FIG. 5 illustrates an example of a wide field-of-view holographic display. In FIG. 5, a holographic display 500 comprises a light source 502, a SLM positioned in a hologram plane 504, an optical element (not shown), an image plane 508, and a viewing window 510. The light source 502 is configured to apply a sub-hologram 506 via the optical element to the SLM on the hologram plane 504, so that a user 512 may view an output image, which is generated based on the sub-hologram 506, displayed on the image plane 508 via the viewing window 510. In particular embodiments, the optical element may be a lens, a diffractive optical element, or a holographic optical element. In particular embodiments, the optical element may focus light from the light source 502 to a point near the viewing window 510. In particular embodiments, the optical element may be positioned in front of the hologram plane 504 or behind the hologram plane 504. In particular embodiments, the user 512 may also capture the output image displayed on the image plane 508 using a camera. In particular embodiments, the SLM may be a phase-only SLM.

In particular embodiments, the holographic display 500 may be a near-eye holographic display. In particular embodiments, the light source 502 may be a laser, and/or any suitable coherent light sources. In particular embodiments, the light source 502 may be diode-pumped solid-state (DPSS) laser, laser diode (LD), light emitting diode (LED), super luminescent light emitting diode (sLED), and/or micro light emitting diode (mLED).

For generating a far-field hologram where each pixel in the far-field hologram affects a whole image, given a phase θ, the image formed under a far-field approximation may be given by Equation 1 shown below, where $\mathscr{F}$ represents the Fourier transform.

$$x_f = |\mathscr{F}\{e^{i\theta}\}|^2 \qquad (1)$$

Furthermore, the holograms light reflected off from the SLM may be generally diffracted by relatively small angles following Equation (2) shown below, where d is pitch of a maximum spatial frequency that may be displayed on the hologram, equal to the size of two pixels on a holographic SLM.

$$\sin(p) = \lambda/d \qquad (2)$$

In particular embodiments, the field of view in certain optical systems may be 2p.

In particular embodiments, the light illuminating the hologram may be a beam that converges towards the viewing window 510. This configuration allows light to span a much larger range of angles when it reaches the user 512, expanding the field of view significantly. In particular embodiments, the light incident on each region on the hologram may be steered by a maximum angle of 2p relative to the incident illumination. Therefore, the area that contributes to each point in the output image may be confined to a local region of the hologram, for example, a sub-hologram. To confine an appropriate size of the hologram, a convolution between the phase and a propagation kernel k is calculated using Equation (3) below, where $\mathscr{F}^{-1}$ represents inverse Fourier transform and represents element-wise multiplication.

$$x_n = |\mathscr{F}^{-1}\{\mathscr{F}\{e^{i\theta}\} \cdot \mathscr{F}\{k\}\}|^2 \qquad (3)$$

This propagation kernel may take on the form of a Zernike polynomial used to represent focus using Equation 4 shown below, where a is its scaling parameter that corresponds to the focus and ρ is a radial distance from each pixel from the center of the propagation kernel, both of which are defined by an experimental optical setup based on the holographic display 500. The propagation kernel may also include additional Zernike polynomial terms to compensate to for aberrations in the optical system. The propagation kernel may also vary spatially to allow for varying image focus or aberrations in the system.

$$k(p) = e^{i \cdot a(2p^2 - 1)} \quad (4)$$

The propagation kernel focuses a limited area of the hologram onto a single point on the image plane 510. The spatial resolution of the propagation kernel, and therefore, ρ are defined by the receptive field of the optical system, i.e., the spatial extent of the phase profile which affects a point in the image plane 510 after propagation.

Figure 6:
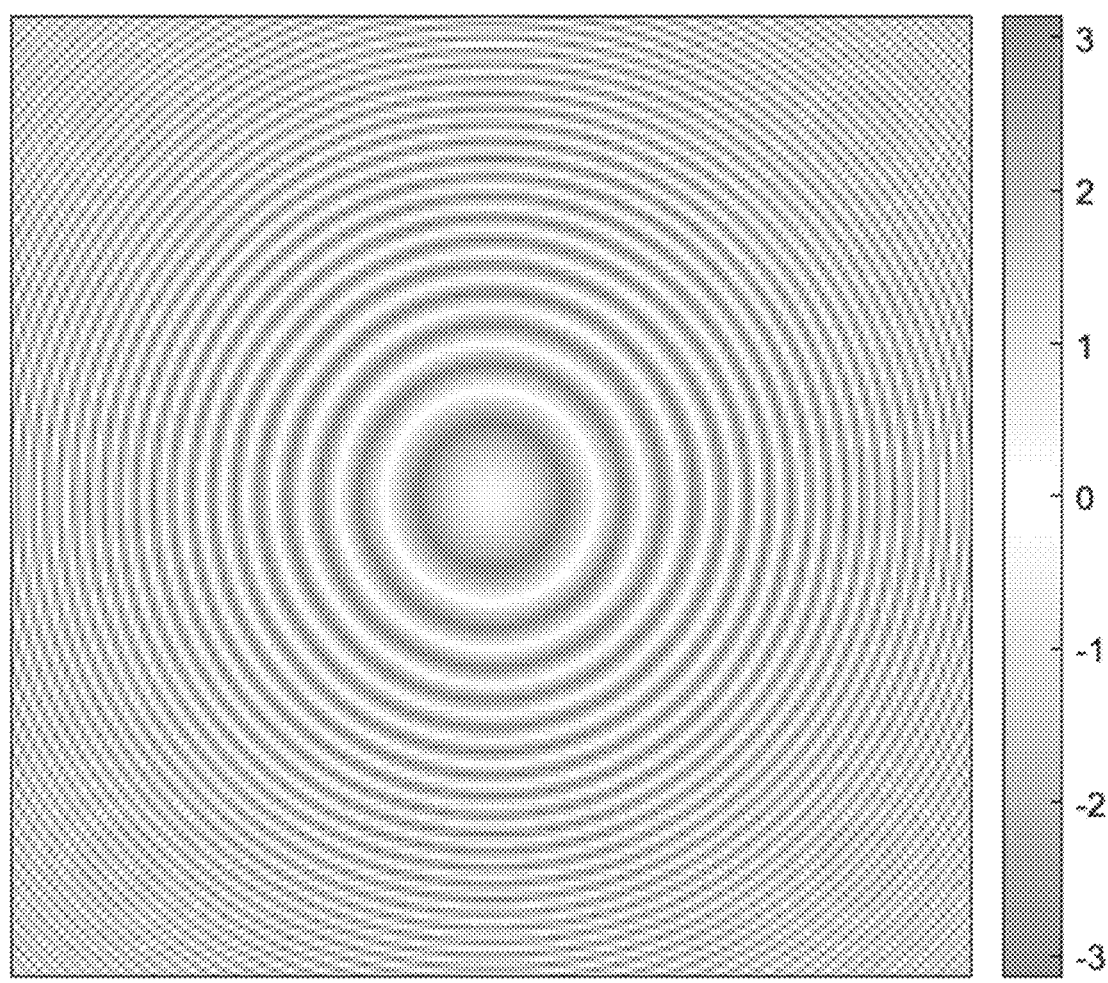
FIG. 6 illustrates an embodiment of a propagation kernel.

FIG. 6 illustrates a visualized phase of an example propagation kernel. In particular embodiment, the size of the propagation kernel may be 177×177 pixels. The computing methods disclosed above, such as GS and Fienup algorithms, may not be able to generate an appropriate hologram for these optical systems. Furthermore, the computing methods might not be able to take a size of sub-hologram into consideration when computing a hologram. Therefore, a propagation kernel shown in FIG. 6 is used to expand the receptive field and generate a confined sub-hologram in comprehensive optical systems to compute the output image.

Figure 7A:
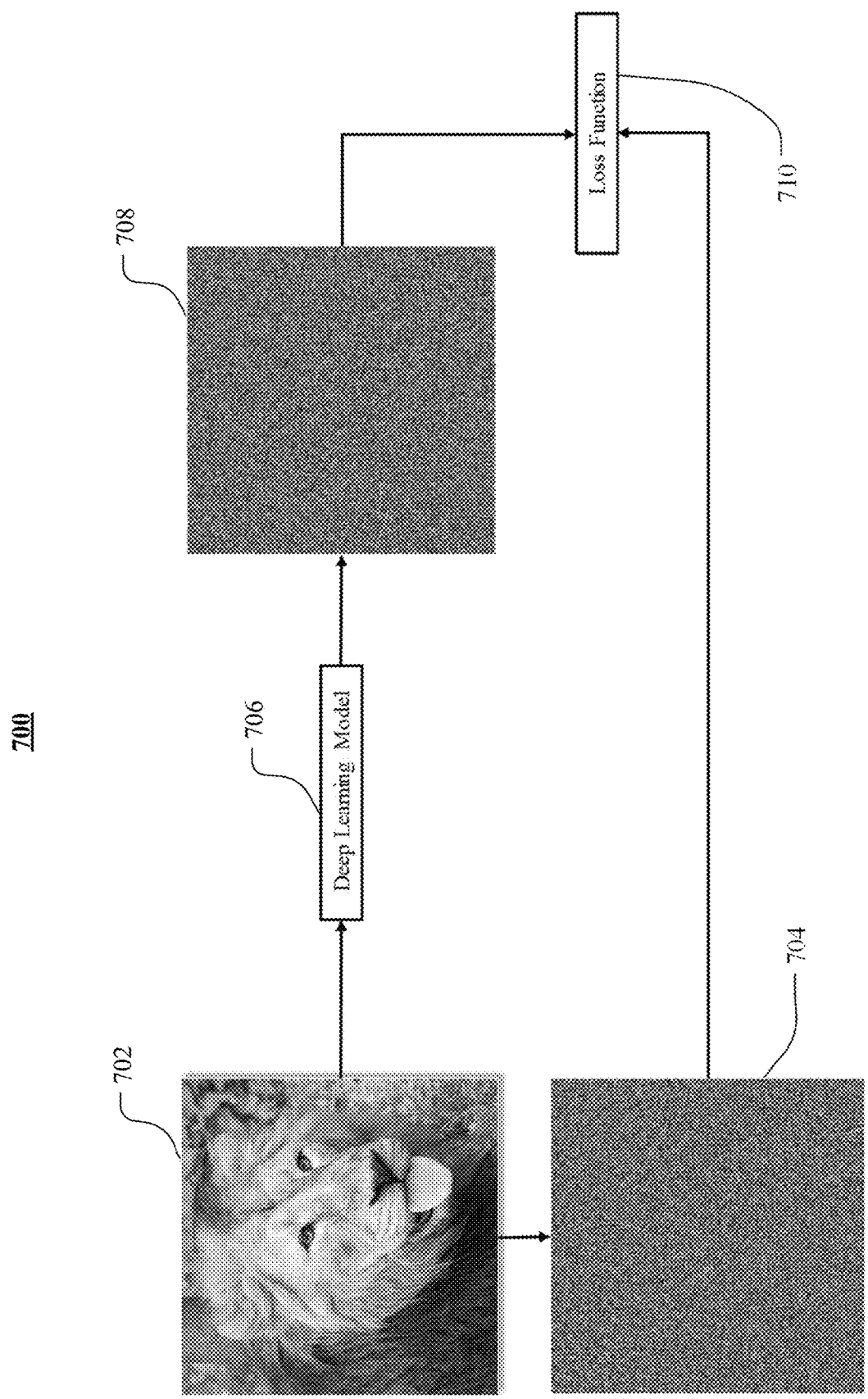
FIGS. 7A-7B illustrate embodiments of methods for training a deep-learning model.
Figure 7B:
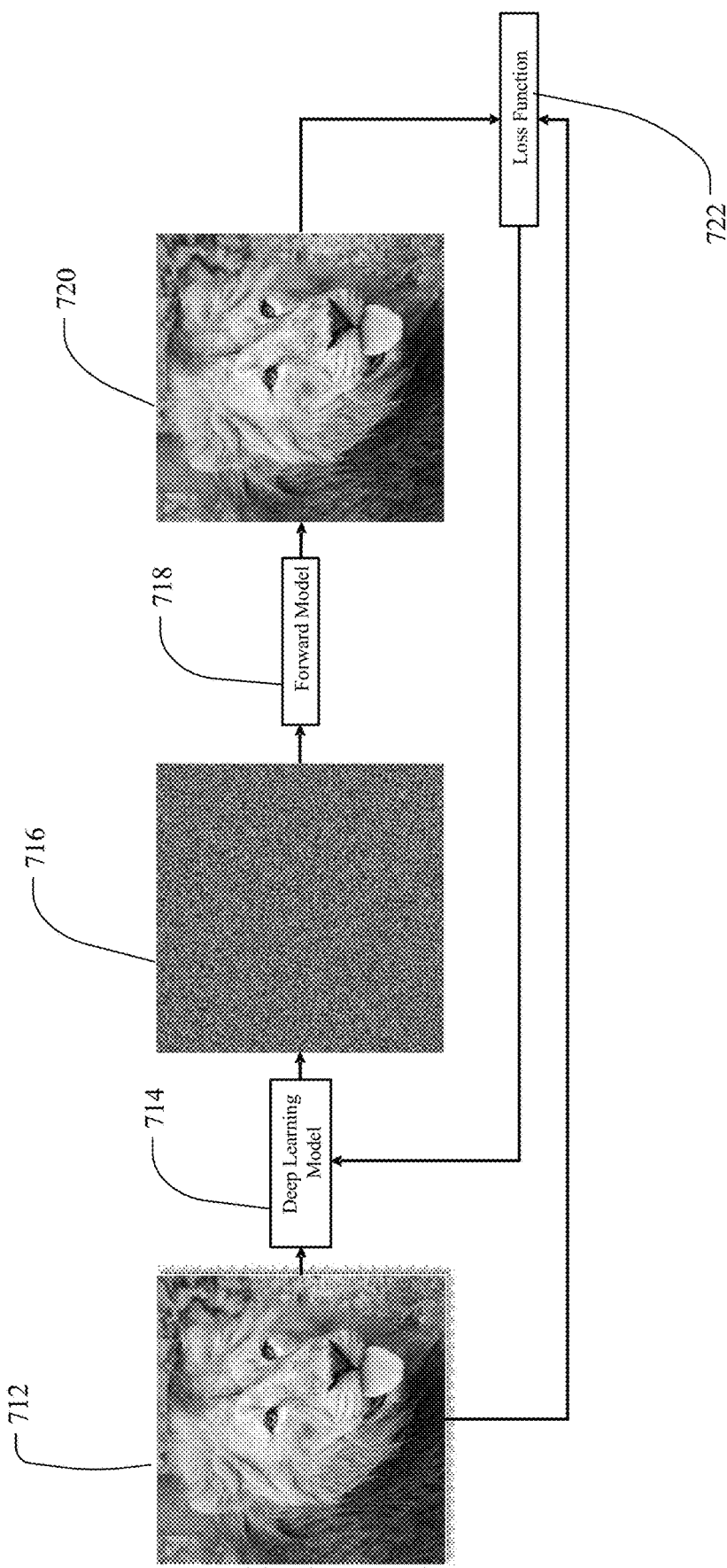

FIGS. 7A-7B illustrates an example method to train a deep-learning model based on a loss function. FIG. 7A illustrates a method 700 to train a deep-learning model 706. The method 700 starts with accessing an input image 702 from a dataset. The method 700 generates a hologram 704 based on the iterative method described in FIGS. 2A-2E. In particular embodiments, the method 700 may compute the hologram 704 using any other computing method which may digitally compute a holographic interference pattern. The method 700 also computes a hologram 708 utilizing a deep-learning model 706. In particular embodiments, the deep-learning model 706 may comprise a convolutional neural network as further described in detail in FIG. 8. The method 700 may compare the hologram 704 computed based on the iterative method with the hologram 708 computed based on the deep-learning model 706. The method 700 may calculate a loss between the two holograms 704, 708 based on a loss function 710. The method 700 may then update the deep-learning model 706 based on the loss between the two holograms 704, 708. The method may repeat computing a new hologram 708 using the updated deep-learning model 706 and performing the comparison between the new hologram 708 and the hologram 704 computed based on the iterative method until the method 700 is determined that the training is completed based on a predetermined termination rule, such as a certain number of input image.

FIG. 7B illustrates a method 701 to train a deep-learning model 714 with a forward model 718. The method 701 starts with accessing an input image 712 from a dataset. The method 701 computes a hologram 716 utilizing the deep-learning model 714. In particular embodiments, the deep-learning model 714 may comprise a convolutional neural network as further described in detail in FIG. 8. The method 701 simulates a pre-determined output image 720 utilizing a forward model 718 based on the hologram 716. In particulate embodiments, the forward model 718 simulates the pre-determined output image 720 as an output image captured from the SLM when the hologram 716 is applied to the SLM. In particular embodiments, the forward model 718 applies a light source with a phase against each pixel within a propagation kernel, and then convolves the hologram 716 to generate a corresponding portion of the pre-determined output image 720. The phase used in the forward model 718 may be predicted based on characteristics of the hologram 716 or a holographic display which displays holograms generated by the deep-learning model 714 after being trained. The holographic display may be a holographic display in FIG. 5, and the propagation kernel may be a propagation kernel described in FIGS. 5-6. In particular embodiments, the propagation kernel may be a pre-defined defocus kernel. In particular embodiments, the propagation kernel may be ⅙ of the size of the hologram 716. In particular embodiments, the propagation kernel may be defined based on an optical system designed for viewing holograms generated by the deep-learning model 714. The forward model 718 may back the phase propagation and not artificially limit the space of potential generated phases.

The method 701 may then compare the output image 720 with the input image 712. The method 701 may calculate a loss between the two images based on a loss function 722. The method 701 may then update the deep-learning model 714 based on the loss between the two images until the method 701 is determined that the training is completed based on a predetermined termination rule, such as a certain number of input image.

In particular embodiments, networks in the deep-learning models 706, 714 may be trained using MS-COCO dataset, and the images are cropped to a resolution of 300×300 pixels. In particular embodiments, networks in the deep-learning models 706, 714 may be trained using DIV2K super-resolution test dataset, and the images are cropped to a resolution of 1920×1080 pixels.

Figure 8:
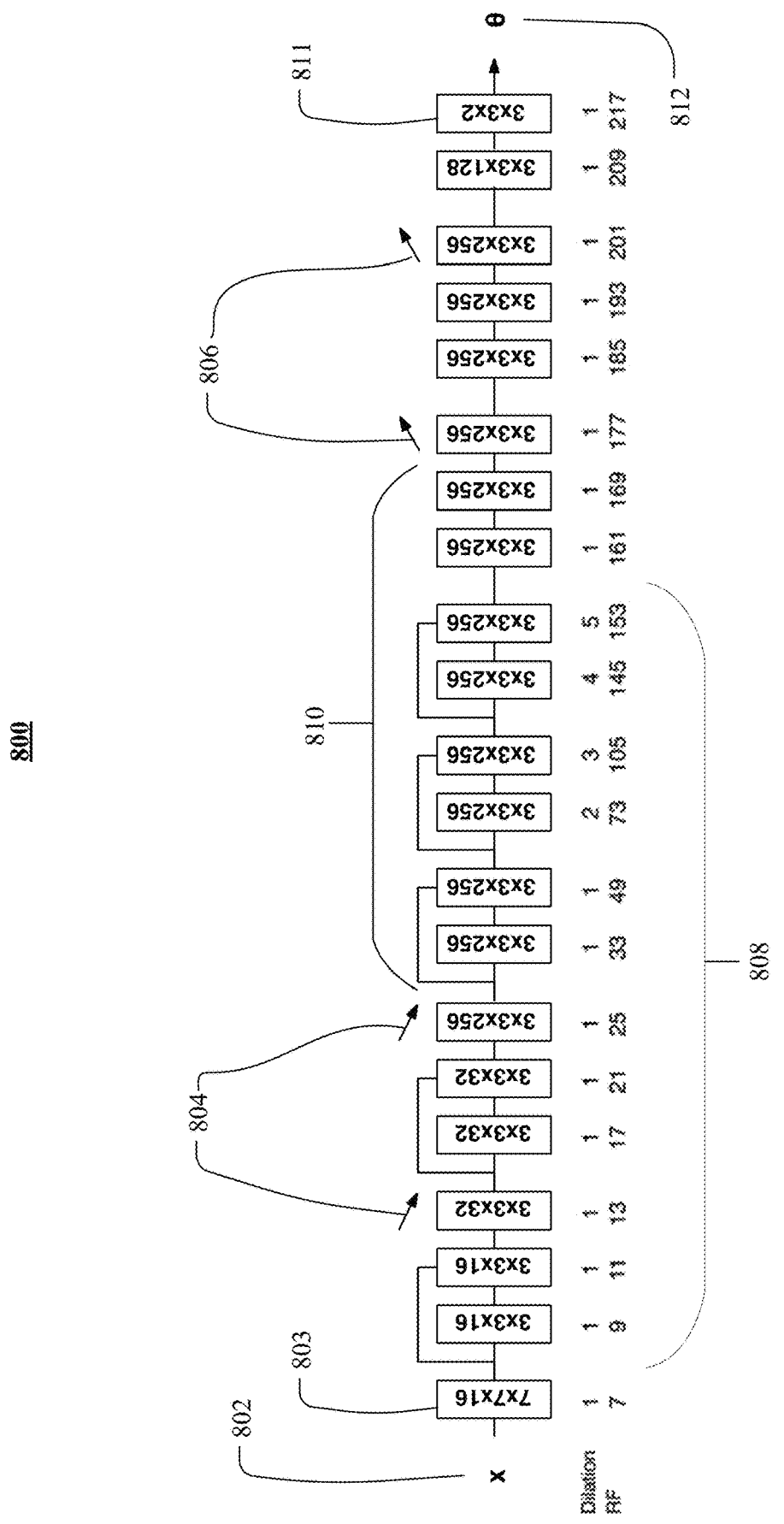
FIG. 8 illustrates an embodiment of an example network architecture.

FIG. 8 illustrates an embodiment of a network architecture. The network 800 is a convolutional neural network to synthesize sub-holograms for holographic displays disclosed herein. The network 800 combines Res-Net style residual blocks 808 with dilated convolution blocks 810. In particular embodiments, the network 800 may be U-Net style convolutional neural network. In particular embodiments, the network 800 may be a multiscale U-Net architecture with Res-Net blocks. Each of the convolutional layers is batch normalized and is activated with a parameterized ReLU activation function—with the exception of transposed convolutional layers which do not have any batch normalization. In this example dilated network, the network 800 comprises a convolutional layer for downsampling 804 with a stride of 2, instead of max-pooling to avoid introducing checkerboard artifacts.

An input image 802 is sent to a first layer 803 of the network 800, after downsampling 804, each of residual blocks increases in both number of channels as well as the dilation rate to create a large receptive field for the network 800. The output of the convolution blocks 810 is then passed to a transposed convolutional layer for upsampling 806 by a factor of 2× to restore the network 800 to original spatial dimensions of the input image 802. After upsampling 806, a final layer 811 of the network 800 has two channels as its output which are then used as the real and imaginary parts of an output phase profile. The network 800 may then normalize the phase to have unit amplitude, resulting in a desired phase-only output image 812. In particular embodiments, the dilation rate for each layer in the network 800 may be in a range from two to five. In particular embodiments, the receptive field from the first layer 803 to the last layer 811 may be gradually increase from 7 to 217.

Assuming that the input image 802 is x, the network 800 generates a complex phase $\bar{\theta}$ and pre-determines a propagation kernel k, and the output image 812 is x̂ which is determined by Equation (5) shown below.

$$\hat{x} = |\mathcal{F}^{-1}\{\mathcal{F}\{\tilde{m}\} \cdot \mathcal{F}\{k\}\}|^2 \qquad (5)$$

Then, a loss $\mathcal{L}_{image}$ between the input image 802 and the output image 812 is determined using Equation (6) shown below.

$$\mathcal{L}_{image} = \|x - \hat{x}\|_1 \qquad (6)$$

In order to reduce unwanted high-frequency noise, particularly in homogeneous areas where generating sub-holograms may have difficulties, a loss $\mathcal{L}_{grad}$ for penalizing the log error of the image gradients may be determined by Equation (7) shown below.

$$\mathcal{L}_{grad} = \log_{10}(\|\nabla x - \nabla \hat{x}\|_1) \qquad (7)$$

Therefore, a total loss function may be determined by Equation (8) shown below, where a coefficient γ may allow the network 800 to trade-off the penalty between the two losses.

$$\mathcal{L}_{total} = \mathcal{L}_{image} + \gamma \mathcal{L}_{grad} \qquad (8)$$

In particular embodiments, the network 800 may be trained with γ=1.0.

In particular embodiments, the network 800 may comprise at least two convolutional blocks, at least two dilated convolutional blocks, and at least two deconvolutional blocks. Each one of the convolutional blocks may comprise a convolutional layer configured to downsample an input using a stride of at least two. Each one of the dilated convolutional blocks may be configured to utilize the propagation kernel with a dilation rate ranged from two to five. Each one of the at least two deconvolutional blocks comprises a transposed convolutional layer configured to upsample by upscaling a factor of at least two times.

In particular embodiments, omitting residual connections may be beneficial to compensate any artifacts caused by the dilation and transposed convolutions. In particular embodiments, the dilation rate similarly varies by at least one between channels to ensure alternating coverage area at each layer. In particular embodiments, the network 800 may utilize Xavier initialization for all weights defined for convolution, except for transposed convolutional layers which are initialized with a bilinear upsampling kernel, e.g. the transposed layer for upsampling 806.

In particular embodiments, the length and number of channels per layer in the network 800 may be chosen through experimentation to find the shortest network, e.g. fewer residual blocks 808, which may achieve adequate reconstruction quality. In particular embodiments, additional residual blocks 808 with higher dilation rates may be required as the kernel grows depending on the parameters and receptive field of the propagation kernel.

Figure 9A:
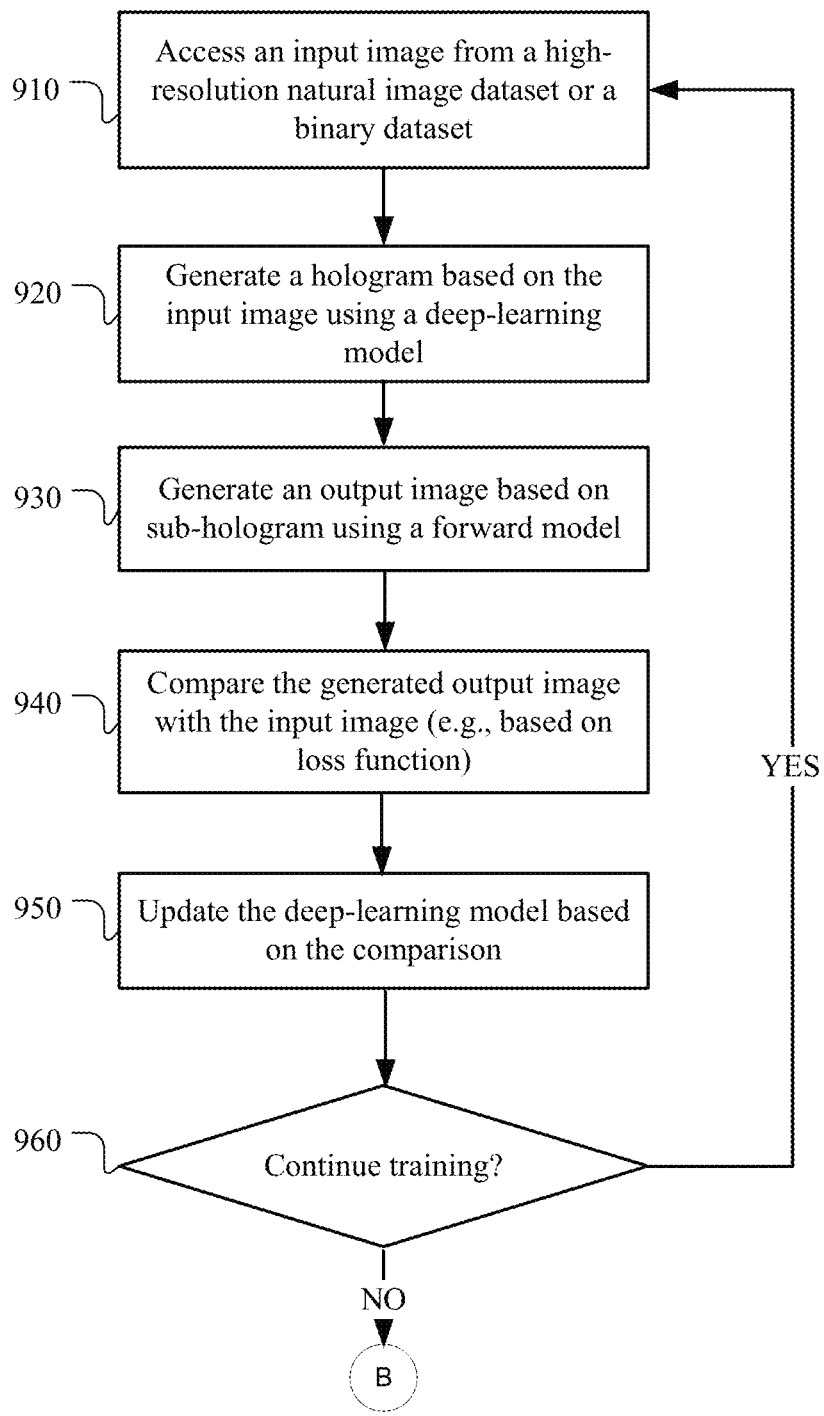
FIG. 9A illustrates an embodiment of a method for training a deep-learning model.

FIG. 9A illustrates an example method 900 for training a deep-learning model to generate a hologram based on natural images. The method may begin at step 910, where a computing system used for training the deep-learning model may access an input image from a training dataset. In particular embodiments, the dataset may be a natural image dataset, a binary dataset, handwritten digit dataset, or any other suitable dataset for training a deep-learning model. A resolution of natural images in the natural image dataset may be at least 1080p. In particular embodiments, the dataset may be MS-COCO dataset, DIV2K super-resolution test dataset, or MNIST dataset.

At step 920, the system may generate a hologram based on the input image using a deep-learning model. Those input images are provided to a convolutional neural network of the deep-learning model, as described above, and the current network would process the information based on its current state or parameters to generate the hologram. In particular embodiments, the hologram may be a sub-hologram of a larger hologram. In particular embodiments, the hologram may have a size of 1/12, 1/9, or 1/6 of a resolution of the first image.

At step 930, the system may generate an output image based on the hologram using a forward model. In particular embodiments, the forward model simulates the interactions between a light source and the hologram using a propagation kernel to generate a corresponding portion of the output image.

At step 940, the system may compare the generated output image with the input image pixel-to-pixel to calculate a loss based on a loss function. In particular embodiments, the generated output image may be compared to the input image, e.g. ground truth image, using a loss function. An optimization of that loss function may then be the basis for updating the parameters of the deep-learning model to improve its results. In particular embodiments, the training loss may be defined and calculated as described in FIG. 8.

At step 950, the system may update the deep-learning model based on the comparison. In particular embodiments, the system may update the deep-learning model based on the loss between the input image and the generated output image. In particular embodiments, the updates are made in an effort to optimize the loss function or to minimize the difference between the generated output image and the input image. The updated deep-learning model may be configured to process one or more input images to generate one or more corresponding holograms after finishing training, as described in FIG. 9B. At the end of the current training iteration, the model may be updated as described in further detail below. During the next training iteration, the updated deep-learning model would be used to generate the hologram based on the next input image, and so on. It should be noted that, while in this example the process is described as using one input image per iteration, one of ordinary skill in the art would recognize that multiple input images (e.g., 2, 4, 9, or 16 input images) may be concurrently used in each training iteration.

At step 960, the system may determine whether to continue training, which may be based on predetermined termination rules. In particular embodiments, training may terminate once a predetermined number (e.g., 1000, 10,000, etc.) of input images, i.e. training samples, have been used to train the deep-learning model. In particular embodiments, training may terminate once the input images in the training dataset have all been used to train the model. In particular embodiments, training may terminate when the loss comparison is sufficiently small or below a predetermined threshold. If the system determines that training should continue, the process may repeat from step 910. If instead, the system determines that training should terminate, training would terminate. The trained deep-learning model is configured to generate a hologram based on input images. In particular embodiments, the generated hologram may be used for wide FOV holographic displays.

Figure 9B:
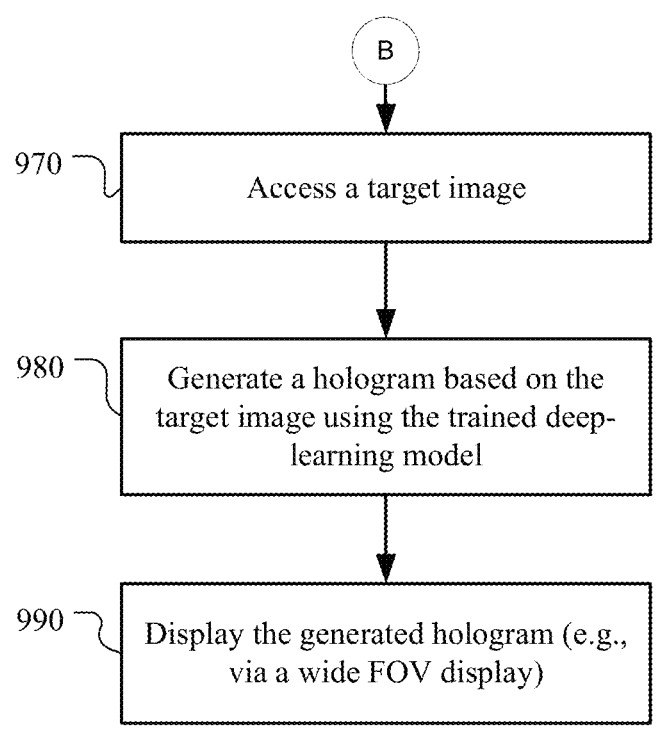
FIG. 9B illustrates an embodiment of a method to generate holograms using a trained deep-learning model.

FIG. 9B illustrates an example method 901 for using a trained deep-learning model to generate a hologram based on a high-resolution natural image. The trained deep-learning model may be provided to or displayed on any computing system (e.g., an end user's device, such as a smartphone, virtual reality system, gaming system, etc.). The method may begin at step 970 where the computing system may access a target image. This target image (which may be a natural image) may be provided by, for example, an imaging engine or any other application that wishes to generate a holographic effect to the target image. At step 980, the system may generate a corresponding hologram using the trained deep-learning model. Then at step 990, the system may display the hologram via the computing system's display, such as a wide FOV holographic display.

Particular embodiments may repeat one or more steps of the methods of FIGS. 9A-9B, where appropriate. Although this disclosure describes and illustrates particular steps of the methods of FIGS. 9A-9B as occurring in a particular order, this disclosure contemplates any suitable steps of the methods of FIGS. 9A-9B occurring in any suitable order. Moreover, although this disclosure describes and illustrates example methods for training the deep-learning model via a forward model including the particular steps of the methods of FIGS. 7A-7B, this disclosure contemplates any suitable methods that include any suitable steps, which may include all, some, or none of the steps of the methods of FIGS. 9A-9B, where appropriate. Furthermore, although this disclosure describes and illustrates particular components, devices, or systems carrying out particular steps of the methods of FIGS. 9A-9B, this disclosure contemplates any suitable combination of any suitable components, devices, or systems carrying out any suitable steps of the methods of FIGS. 9A-9B.

Figure 10:
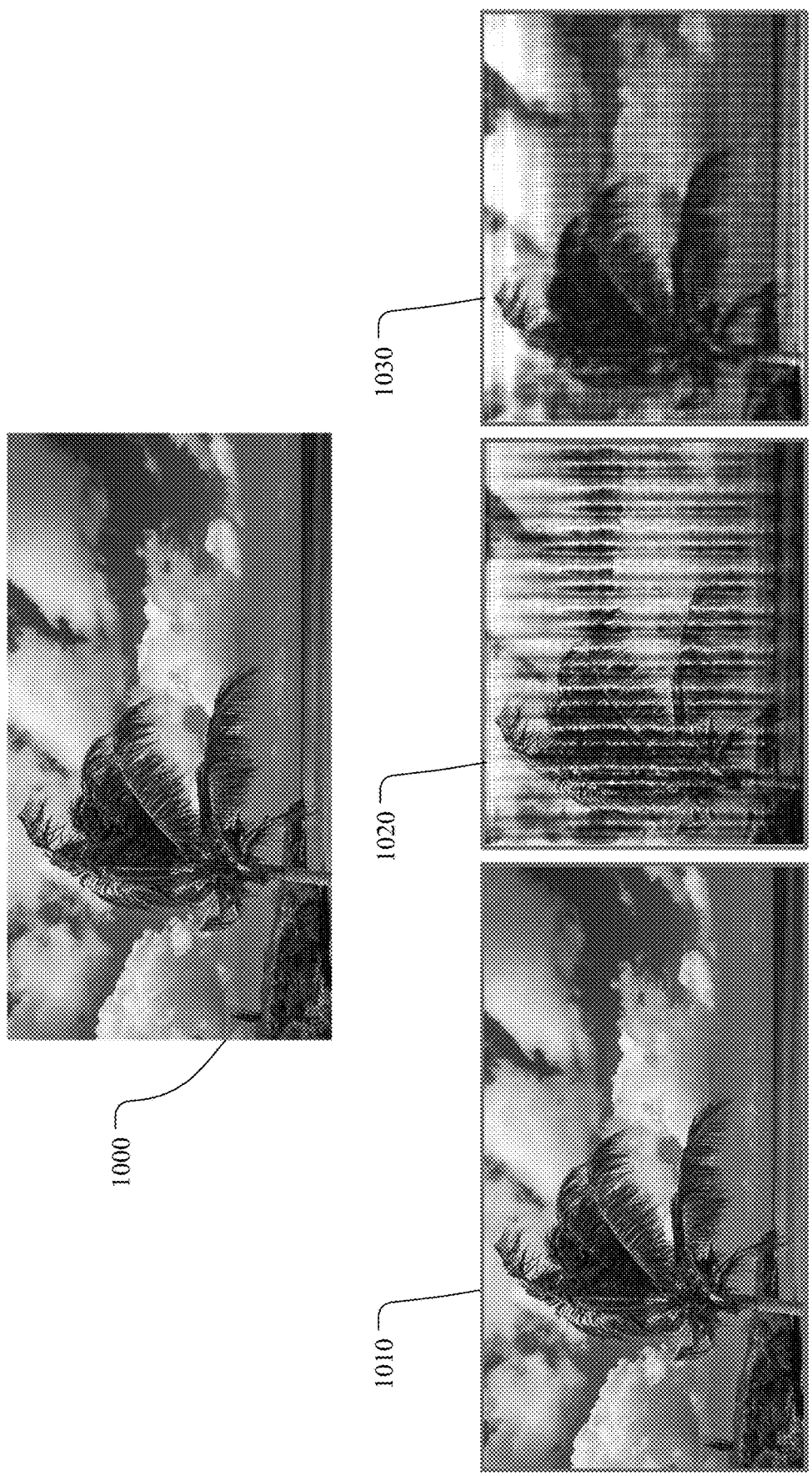
FIGS. 10-11 illustrate embodiments of output images computed by trained networks.
Figure 11:
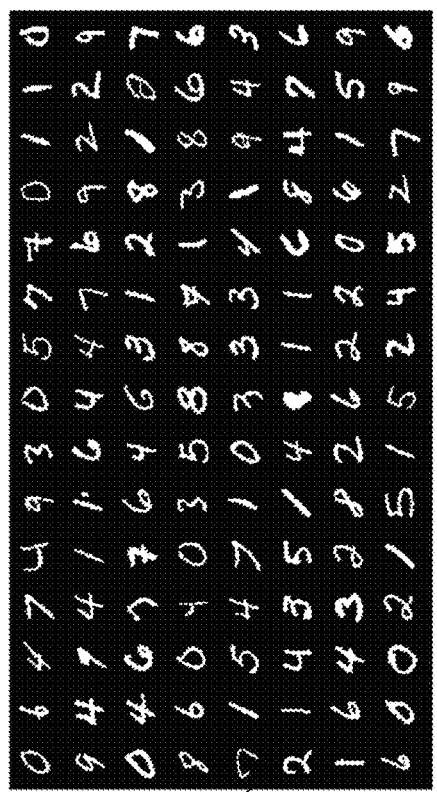
Figure 11:
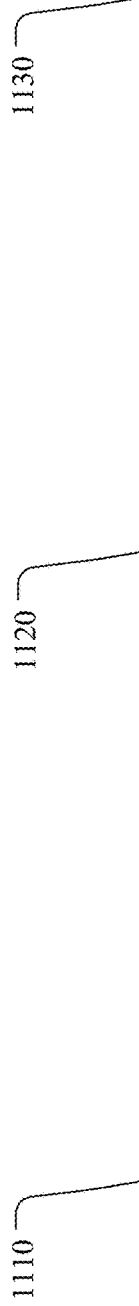
Figure 11:
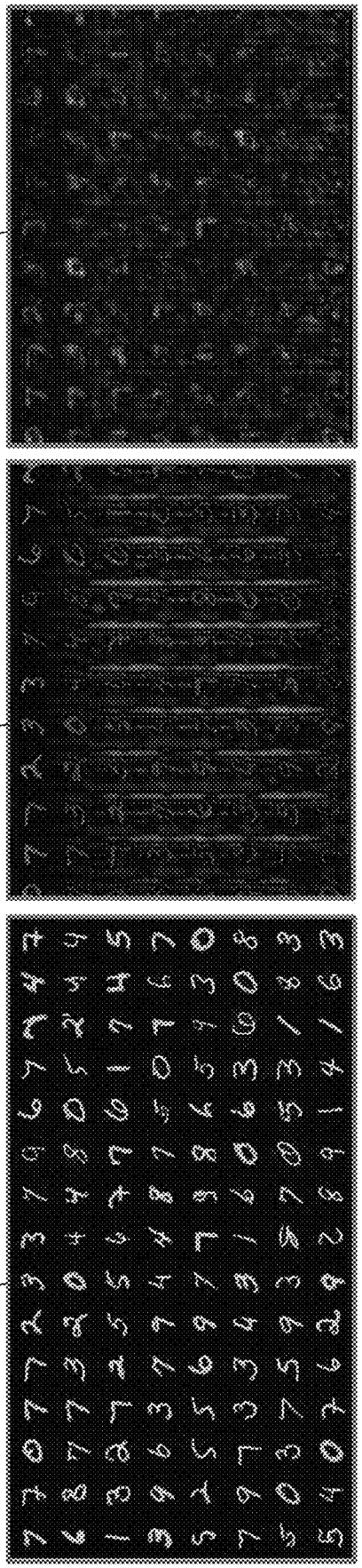

FIGS. 10-11 illustrate output images computed by three trained networks based on an input image. After training networks using methods described in FIGS. 9A-9B, a computing system is configured to compute a hologram given an input image for different size of sub-hologram, and then apply the computed hologram to the SLM to be captured by a camera or viewed by a user. In particular embodiments, the size of the sub-hologram may be $\frac{1}{12}$th, $\frac{1}{8}$th, and $\frac{1}{6}$th of the SLM resolution. In particular embodiments, the resolution of the input image may be 1920×1080, i.e. 1080p. In particular embodiments, a size of the propagation filter used in reading the input image may be 91×91, 121×121 or 177×177 pixels, or a size of small, medium, or large portion which respectively matches appropriate fractions along the shorter side of the SLM. A PSNR measurement will be performed for each output image reconstructed by the SLM based on its corresponding computed hologram.

FIG. 10 illustrates output images computed by three networks trained by a natural image dataset. In particular embodiments, the natural image dataset may be DIV2K super-resolution test dataset. In particular embodiments, the input image 1000 may be a natural image with at least 1080p resolution. In particular embodiments, the input image 1000 may be converted to grayscale. An output image 1010 is computed by a network which is trained by a method including a forward model described in FIG. 7B. Output images 1020, 1030 are computed by networks with are trained by a method without a forward model described in FIG. 7A. The output image 1010 computed by the network trained with the forward model successfully reconstructs every feature in the original input image 1000. On the other hand, the output images 1020, 1030 computed by the networks without the forward model lose some of features in the original input image 1000 and have lower PSNR values than the output image 1010, which represents that the output image 1010 have a better quality than output images 1020, 1030.

FIG. 11 illustrates output images computed by three networks trained by a binary image dataset based on an input image 1100. In particular embodiments, the binary image dataset may be MINST dataset. In particular embodiments, the input image 1100 may be a simple, sparse binary image with at least 1080p resolution. An output image 1110 is computed by a network which is trained by a method including a forward model described in FIG. 7B. Output images 1120, 1130 are computed by networks with are trained by a method without a forward model described in FIG. 7A. The output image 1110 computed by the network trained with the forward model successfully reconstructs every feature in the original input image 1100. On the other hand, the output images 1120, 1130 computed by the networks without the forward model lose most of features in the original input image 1100 and have lower PSNR values than the output image 1110, which represents that the output image 1110 have a better quality than output images 1120, 1130. The network trained by a forward model outperforms the network trained without the forward model.

As described above, embodiments described herein provide a forward model to train loss for a deep-learning-based approach to solve the problems in the existing optical environments. The forward model in the present disclosure solves the issues caused by the limited receptive field and the size of the sub-hologram by applying spatially-varied propagation kernels to perform convolution.

Figure 12:
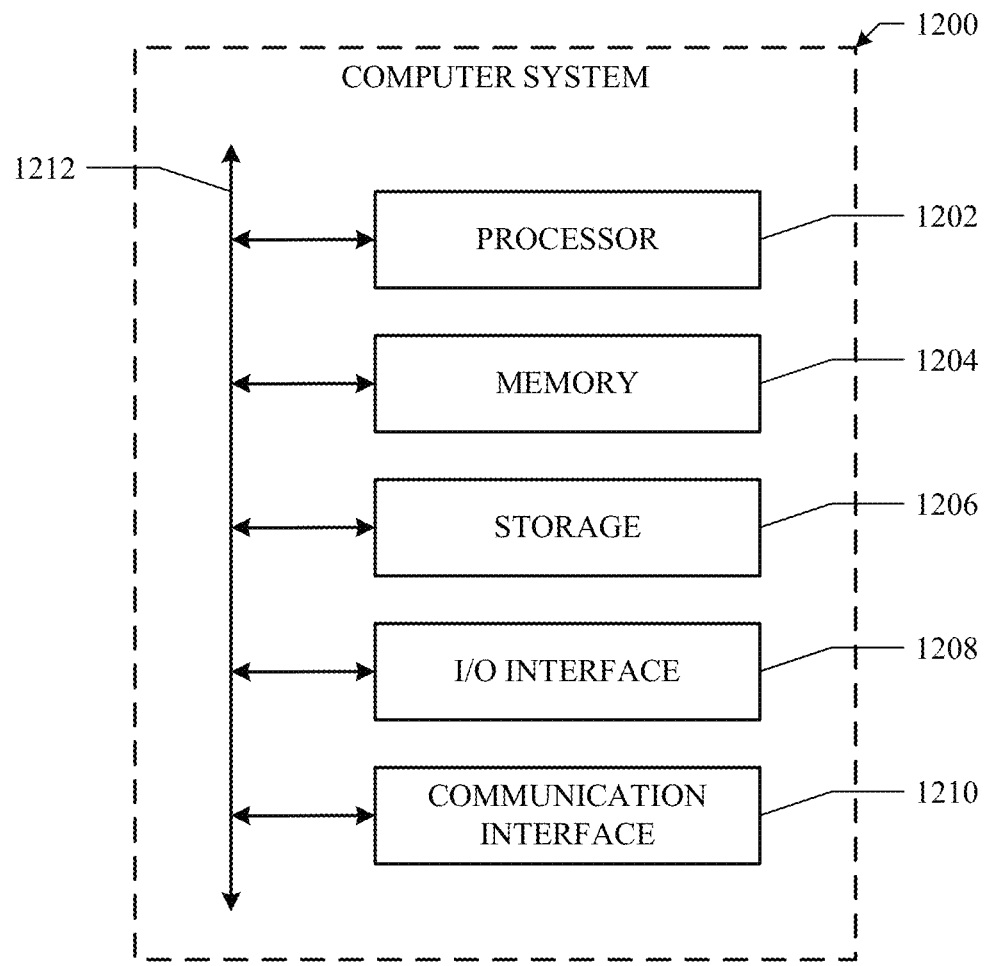
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    generating a hologram by processing a first natural image using a machine-learning model, wherein the first natural image that is provided to the machine-learning model is a photograph of a real world;
    generating a second image that is a reproduced representation of the first natural image by processing at least a portion of the hologram using a processing model that is configured to simulate interactions between a light source and the hologram;
    comparing (1) the second image generated after the processing of the hologram and (2) the first natural image resulting before the processing of the hologram to calculate a loss based on a loss function; and
    training the machine-learning model by iteratively updating the machine-learning model based on the loss between the first natural image and the second image, wherein the trained machine-learning model is configured to receive as an input a single natural image on which to add holographic effect and the trained machine-learning model is further configured to generate a final hologram based on the single natural image for display via a holographic display device.

2. The method of claim 1, wherein the machine-learning model comprises one or more dilated convolutional blocks, and wherein the one or more dilated convolutional blocks are configured to utilize a propagation kernel to generate the final hologram.

3. The method of claim 1,
    wherein the machine-learning model comprises at least one residual block that comprises sequentially connected layers, the sequentially connected layers comprising a first layer and a last layer; and
    wherein the residual block is configured to add an input of the first layer to an output of the last layer.

4. The method of claim 1,
wherein the machine-learning model comprises a plurality of layers that includes a last layer and a next-to-last layer;
wherein the machine-learning model is configured to generate a concatenated result by concatenating an input of the machine-learning model with an output of the next-to-last layer; and
wherein the last layer is configured to use the concatenated result as input.

5. The method of claim 1,
wherein the hologram is a sub-hologram of a larger hologram;
wherein the first natural image is a portion of a larger natural image.

6. The method of claim 1,
wherein the processing model is configured to perform convolution of a phase definition on the hologram.

7. The method of claim 6,
wherein the convolution performed by the processing model is based on a propagation kernel.

8. The method of claim 7, wherein the propagation kernel is defined based on an optical system designed for viewing the final hologram generated by the machine-learning model.

9. The method of claim 5, wherein the sub-hologram has a size less than 50% of a resolution of the first natural image.

10. The method of claim 1, wherein a resolution of the first natural image is at least 720p.

11. The method of claim 1, wherein the trained machine-learning model is configured to generate images for wide-field-of-view displays which have a field of view larger than 40 degrees.

12. The method of claim 1, wherein the trained machine-learning model is configured to generate images for near-eye displays, television monitors, cinema screens, computer monitors, mobile phones, or tablets.

13. One or more computer-readable non-transitory storage media embodying software that is operable when executed to:
generate a hologram by processing a first natural image using a machine-learning model, wherein the first natural image that is provided to the machine-learning model is a photograph of a real world;
generate a second image that is a reproduced representation of the first natural image by processing at least a portion of the hologram using a processing model that is configured to simulate interactions between a light source and the hologram;
compare (1) the second image generated after the processing of the hologram and (2) the first natural image resulting before the processing of the hologram to calculate a loss based on a loss function; and
train the machine-learning model by iteratively updating the machine-learning model based on the loss between the first natural image and the second image, wherein the trained machine-learning model is configured to receive as an input a single natural image on which to add holographic effect and the trained machine-learning model is further configured to generate a final hologram based on the single natural image for display via a holographic display device.

14. The media of claim 13, wherein the machine-learning model comprises one or more dilated convolutional blocks, and wherein the one or more dilated convolutional blocks are configured to utilize a propagation kernel to generate the final hologram.

15. The media of claim 13,
wherein the hologram is a sub-hologram of a larger hologram;
wherein the first natural image is a portion of a larger natural image.

16. The media of claim 13,
wherein the processing model is configured to perform convolution of a phase definition on the hologram.

17. The media of claim 16,
wherein the convolution performed by the processing model is based on a propagation kernel, and
wherein the propagation kernel is defined based on an optical system designed for viewing the final hologram generated by the machine-learning model.

18. The media of claim 15, wherein the sub-hologram has a size less than 50% of a resolution of the first natural image.

19. The media of claim 13, wherein a resolution of the first natural image is at least 720p.

20. A system comprising: one or more processors; and one or more computer-readable non-transitory storage media coupled to one or more of the processors and comprising instructions operable when executed by one or more of the processors to cause the system to:
generate a hologram by processing a first natural image using a machine-learning model, wherein the first natural image that is provided to the machine-learning model is a photograph of a real world;
generate a second image that is a reproduced representation of the first natural image by processing least a portion of the hologram using a processing model that is configured to simulate interactions between a light source and the hologram;
compare (1) the second image generated after the processing of the hologram and (2) the first natural image resulting before the processing of the hologram to calculate a loss based on a loss function; and
train the machine-learning model by iteratively updating the machine-learning model based on the loss between the first natural image and the second image, wherein the trained machine-learning model is configured to receive as an input a single natural image on which to add holographic effect and the trained machine-learning model is further configured to generate a final hologram based on the single natural image for display via a holographic display device.

* * * * *